(12) United States Patent
Nakano et al.

(10) Patent No.: US 12,360,225 B2
(45) Date of Patent: Jul. 15, 2025

(54) COMMUNICATION DEVICE AND COMMUNICATION METHOD

(71) Applicant: Sony Semiconductor Solutions Corporation, Kanagawa (JP)

(72) Inventors: Hiroaki Nakano, Tokyo (JP); Takuya Ichihara, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 568 days.

(21) Appl. No.: 17/773,803

(22) PCT Filed: Oct. 30, 2020

(86) PCT No.: PCT/JP2020/040768
§ 371 (c)(1),
(2) Date: May 2, 2022

(87) PCT Pub. No.: WO2021/095558
PCT Pub. Date: May 20, 2021

(65) Prior Publication Data
US 2022/0397656 A1 Dec. 15, 2022

(30) Foreign Application Priority Data
Nov. 14, 2019 (JP) .................................. 2019-206203

(51) Int. Cl.
*G01S 11/02* (2010.01)
*G01S 5/14* (2006.01)

(52) U.S. Cl.
CPC ................. *G01S 11/02* (2013.01); *G01S 5/14* (2013.01)

(58) Field of Classification Search
CPC ............. G01S 11/16; G01S 11/02; G01S 5/14
(Continued)

(56) References Cited

U.S. PATENT DOCUMENTS 9,872,295 B2 * 1/2018 Fukuzono ............. H04W 16/28
11,652,276 B2 * 5/2023 Shiohara ............ H04N 1/00204
343/757

(Continued)

FOREIGN PATENT DOCUMENTS

JP     2009-085780 A    4/2009
JP     2017-067565 A    4/2017

(Continued)

OTHER PUBLICATIONS

International Search Report (PCT/ISA/210), International Application No. PCT/JP2020/040768, dated Jan. 12, 2021.
(Continued)

*Primary Examiner* — Qutbuddin Ghulamali
(74) *Attorney, Agent, or Firm* — Michael Best & Friedrich LLP

(57) ABSTRACT

The present disclosure relates to a communication device and a communication method that enable adaptive positioning.
A communication unit performs wireless communication with a peripheral communication apparatus, and a processing unit outputs, on the basis of a frequency characteristic of a propagation channel, information of a distance to the communication apparatus and reliability level information representing a reliability level of the distance information. The present disclosure can be applied to, for example, a BLE chip.

26 Claims, 29 Drawing Sheets

(58) Field of Classification Search
USPC .................................................... 455/456.1
See application file for complete search history.

(56) References Cited

U.S. PATENT DOCUMENTS

| | | |
|---|---|---|
| 2002/0142782 A1 | 10/2002 | Berliner |
| 2010/0315289 A1* | 12/2010 | Nurmela .............. H04B 17/364 |
| | | 342/385 |
| 2016/0077204 A1 | 3/2016 | Lee |
| 2017/0280294 A1 | 9/2017 | Sommer |
| 2019/0098527 A1* | 3/2019 | Hilborn ............... H04W 28/021 |
| 2020/0229126 A1* | 7/2020 | Soriaga .................... G01S 5/10 |

FOREIGN PATENT DOCUMENTS

| | | |
|---|---|---|
| JP | 2019-023595 A | 2/2019 |
| JP | 2019-174418 A | 10/2019 |

OTHER PUBLICATIONS

Yamada et al., "A study on distance estimation between a base station and terminal s using the multi-carrier signal transmission", Lecture proceedings 1 of the 2017 communication society conference of IEICE, p. 129, Aug. 29, 2017.

\* cited by examiner

COMMUNICATION DEVICE AND COMMUNICATION METHOD

TECHNICAL FIELD

The present disclosure relates to a communication device and a communication method, and more particularly to a communication device and communication method that enable adaptive positioning.

BACKGROUND ART

In recent years, indoor positioning technology for performing positioning indoors or the like where reception of global positioning system (GPS) radio waves is difficult has drawn attention.

For example, Patent Document 1 discloses technology for performing positioning on the basis of a combination of received signal strength indicators (RSSIs) of respective beacon signals from a plurality of transmitters. According to this technology, even in a case where a positioning environment changes, positioning can be performed by collating an RSSI with a database.

CITATION LIST

Patent Document

Patent Document 1: Japanese Patent Application Laid-Open No. 2017-67565

SUMMARY OF THE INVENTION

Problems to be Solved by the Invention

However, with the technology in Patent Document 1, it is necessary to update content of the database according to a change in the positioning environment, and it is not possible to perform adaptive positioning on the basis of reliability of positioning, a remaining battery level, or the like.

The present disclosure has been made to solve the problem mentioned above, and an object of the present disclosure is to enable adaptive positioning.

Solutions to Problems

A communication device according to a first aspect of the present disclosure includes a communication unit that performs wireless communication with a peripheral communication apparatus, and a processing unit that outputs, on the basis of a frequency characteristic of a propagation channel, information of a distance to the communication apparatus and reliability level information representing a reliability level of the distance information.

A communication method according to the first aspect of the present disclosure includes, by a communication device, performing wireless communication with a peripheral communication apparatus, and outputting, on the basis of a frequency characteristic of a propagation channel, information of a distance to the communication apparatus and reliability level information representing a reliability level of the distance information.

In the first aspect of the present disclosure, wireless communication is performed with a peripheral communication apparatus, and, on the basis of a frequency characteristic of a propagation channel, information of a distance to the communication apparatus and reliability level information representing a reliability level of the distance information are output.

A communication device according to a second aspect of the present disclosure includes a communication unit that performs wireless communication with a peripheral communication apparatus, and a processing unit that calculates information of a distance to the communication apparatus by using any one of a plurality of distance measurement techniques based on a wireless signal in the wireless communication, in which the processing unit selects the distance measurement technique used for calculation of the distance information on the basis of a state of power supply of a self-device.

A communication method according to the second aspect of the present disclosure includes, by a communication device, performing wireless communication with a peripheral communication apparatus, selecting any one of a plurality of distance measurement techniques based on a wireless signal in the wireless communication on the basis of a power state of a self-device, and calculating information of a distance to the communication apparatus by using the selected distance measurement technique.

In the second aspect of the present disclosure, wireless communication is performed with a peripheral communication apparatus, any one of a plurality of distance measurement techniques based on a wireless signal in the wireless communication is selected on the basis of a power state of a self-device, and information of a distance to the communication apparatus is calculated by using the selected distance measurement technique.

MODE FOR CARRYING OUT THE INVENTION

Figure 1:
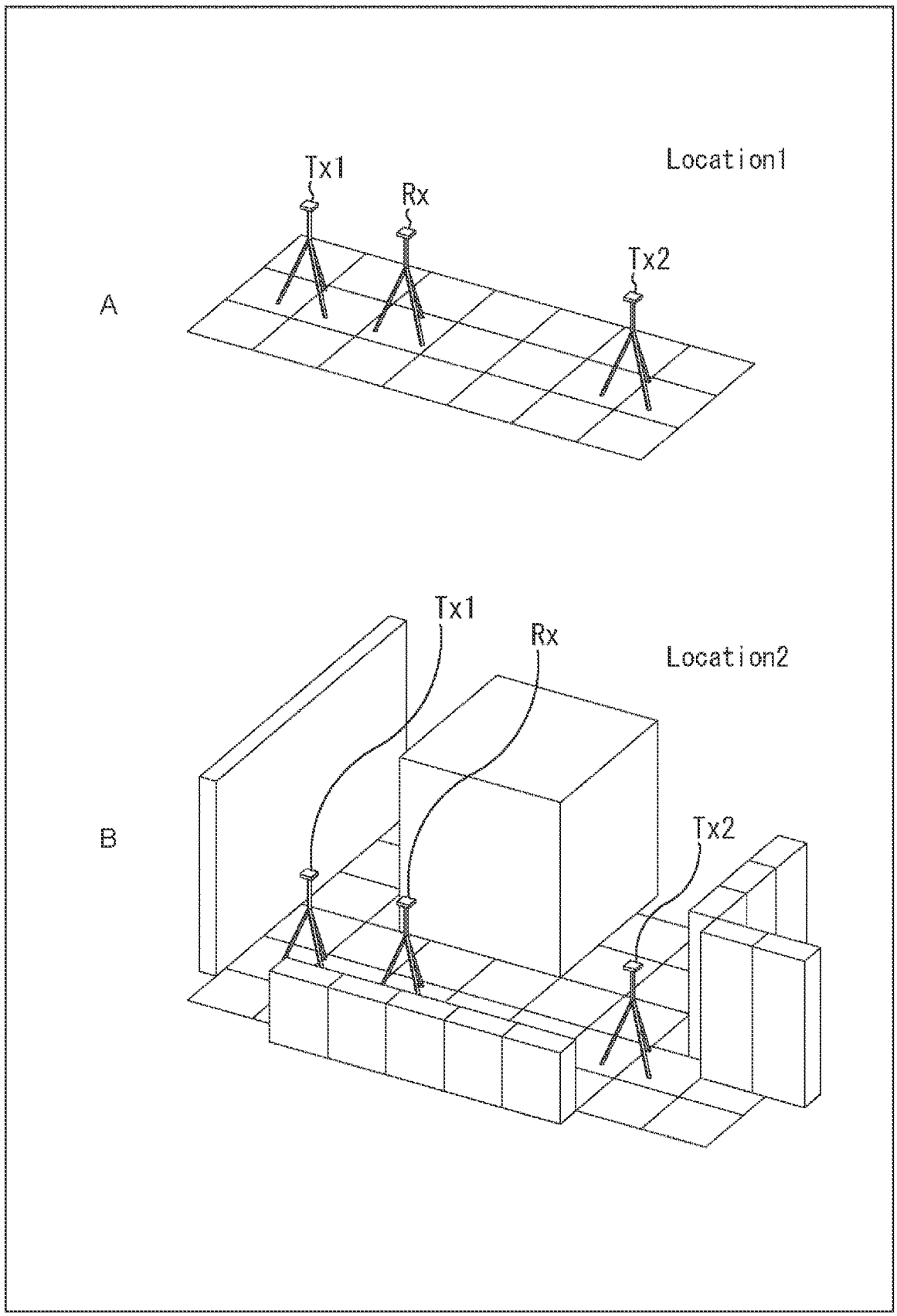
FIG. 1 is a diagram illustrating an example of a positioning environment.

Modes for carrying out the present disclosure (hereinafter, referred to as embodiments) will be described below. Note that the description will be made in the following order.
1. First Embodiment
   1-1. Problems of Conventional Technology
   1-2. Configurations of Communication Terminal and communication module
   1-3. Calculation of distance information
   1-4. Calculation of position information
2. Second Embodiment
   2-1. Problems of conventional technology
   2-2. Configuration of communication module
   2-3. Calculation of distance information Although indoor positioning technology for performing positioning indoors or the like where reception of GPS radio waves is difficult has drawn attention in recent years, adaptive positioning based on reliability of positioning, a remaining battery level, or the like has not been possible.

Hereinafter, embodiments for achieving adaptive positioning will be described.

1. First Embodiment (1-1. Problems of Conventional Technology)

Conventionally, there are known, as techniques of indoor positioning technology, for example, pedestrian dead reckoning (PDR) in which movement or travel amount of a user is measured by a plurality of sensors such as an acceleration sensor and a gyro sensor, and a technique for estimating a position with collation of data such as geomagnetic data. Furthermore, there is cited, as a technique of indoor positioning technology, Time of Flight (ToF) or the like, in which distance is estimated by using time of flight calculated based on a phase difference between a projected light wave and reflected wave of light.

However, with the technique using PDR for example, although distance measurement errors are accumulated, there has been no method for correcting the accumulated distance measurement errors. Furthermore, with the technique that requires collation of data such as geomagnetic data, there have been problems regarding operation, such that creation of a pre-map is essential, and re-creation of a pre-map is necessary when a change in layout occurs, or the like. Moreover, the technique using ToF has a large effect of shadowing (deterioration in distance measurement performance due to a human body), and therefore, has a problem that correct distance cannot be measured unless being in a line-of-sight (Line Of Sight) environment.

As a technique for solving these problems, a distance measurement technique using a wireless signal has been attracting attention. This is because many wireless communication ICs of Bluetooth Low Energy (BLE) (registered trademark), Wi-Fi (registered trademark), Long Term Evolution (LTE), or the like are already built into smartphones, pre-learning or the like is not required, and loading into an application is easy.

However, the distance measurement technique using a wireless signal has a problem that distance measurement accuracy thereof is low.

One of factors of the low distance measurement accuracy is use of an RSSI, which is currently being commercialized. An RSSI is a technique for determining that distance is close when signal intensity of a reception signal is high, and that distance is far when signal intensity of a reception signal is low, and the technique is known to be susceptible to multipaths due to reflected waves.

Figure 2:
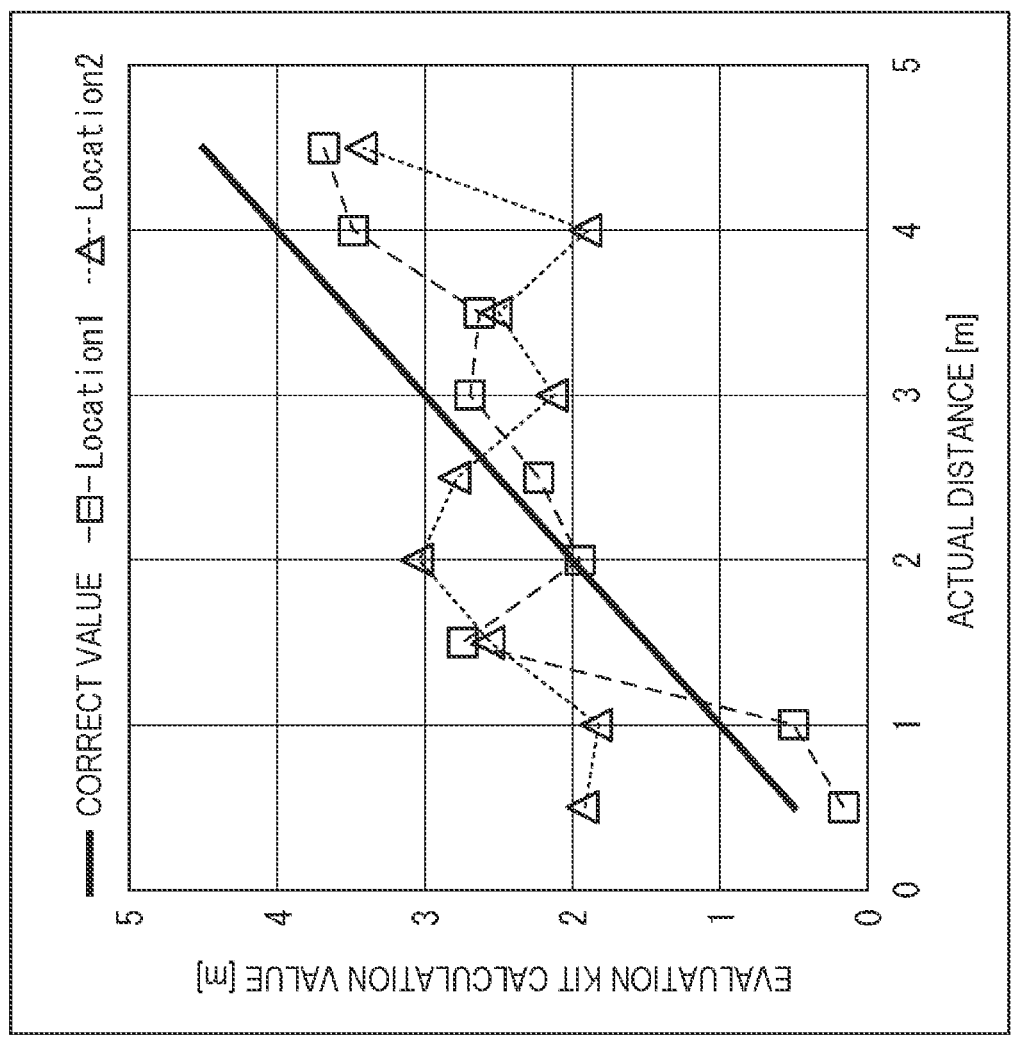
FIG. 2 is a diagram illustrating examples of a result of evaluating distance measurement using an RSSI.

For example, FIG. 2 illustrates examples of a result of evaluating distance measurement using the RSSI in a positioning environment illustrated in FIG. 1.

A of FIG. 1 illustrates a non-multipath environment with no obstacle (Location 1) as a positioning environment, and B of FIG. 1 illustrates a multipath environment with many obstacles (Location 2) as a positioning environment. In each of the positioning environments, distance is calculated by relative reception intensity based on the RSSI of reception signals that a receiver Rx receives from two transmitters Tx1 and Tx2.

FIG. 2 illustrates distance values with respect to actual distances and a straight line representing correct values, the distance values being measured in each of the positioning environments in FIG. 1.

A result of measurement in Location 1 where there is no obstacle shows, along the straight line representing the correct values, an upward slope to some extent with respect to the actual distance, whereas a result of measurement in Location 2 where there are many obstacles is almost flat to the actual distances. In a case where there are many obstacles, signal intensity of a reception signal from a distant position increases due to overlapped reflected waves, and signal intensity of a reception signal from a relatively close position decreases due to cancellation by an antiphase. As a result, distance measurement accuracy is greatly reduced.

Moreover, in distance measurement using the RSSI, distance measurement accuracy is also reduced due to non-uniformity of radiation characteristics of the antennas.

Figure 3:
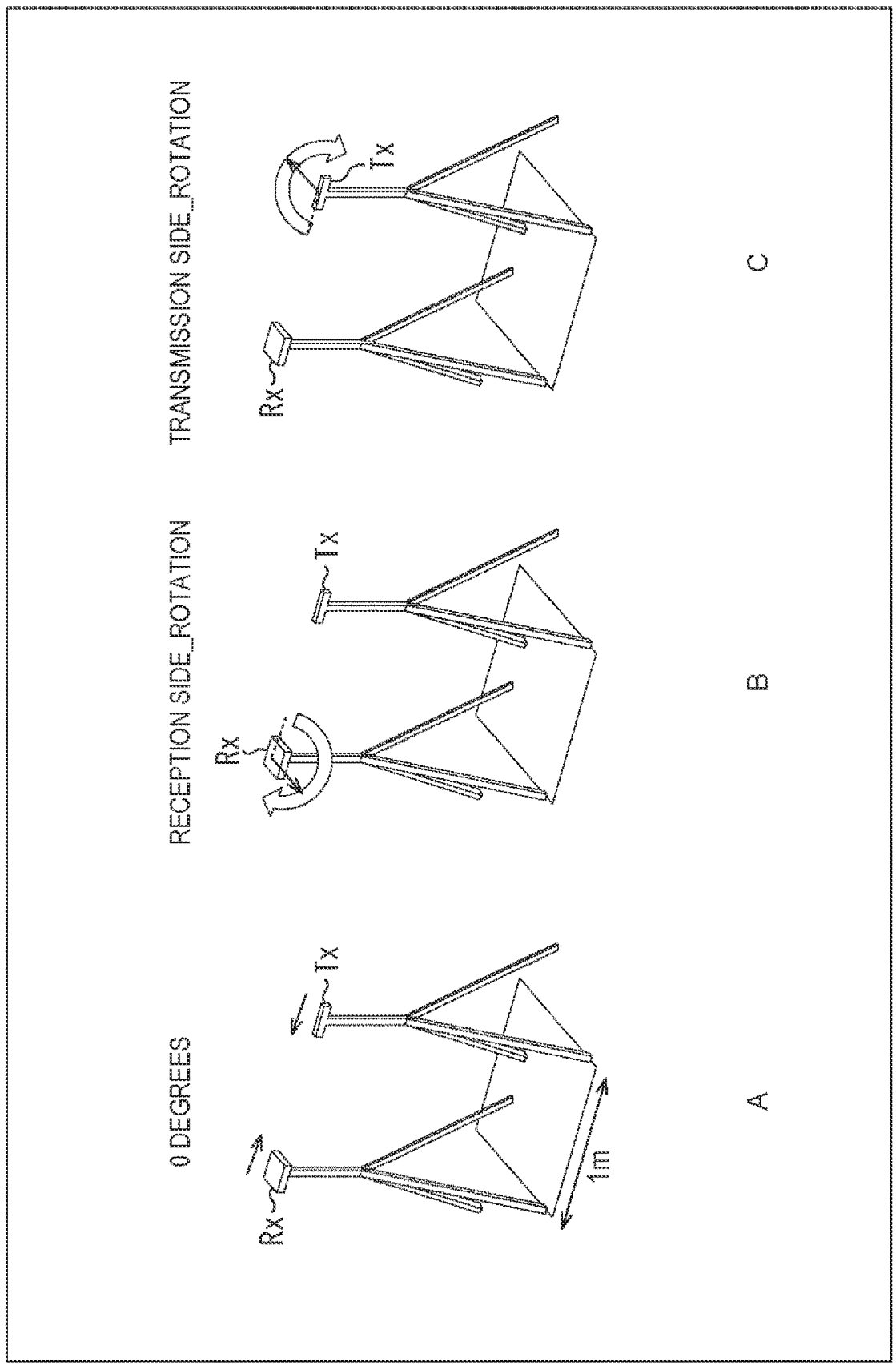
FIG. 3 is a diagram describing measurement of radiation characteristics of antennas.
Figure 4:
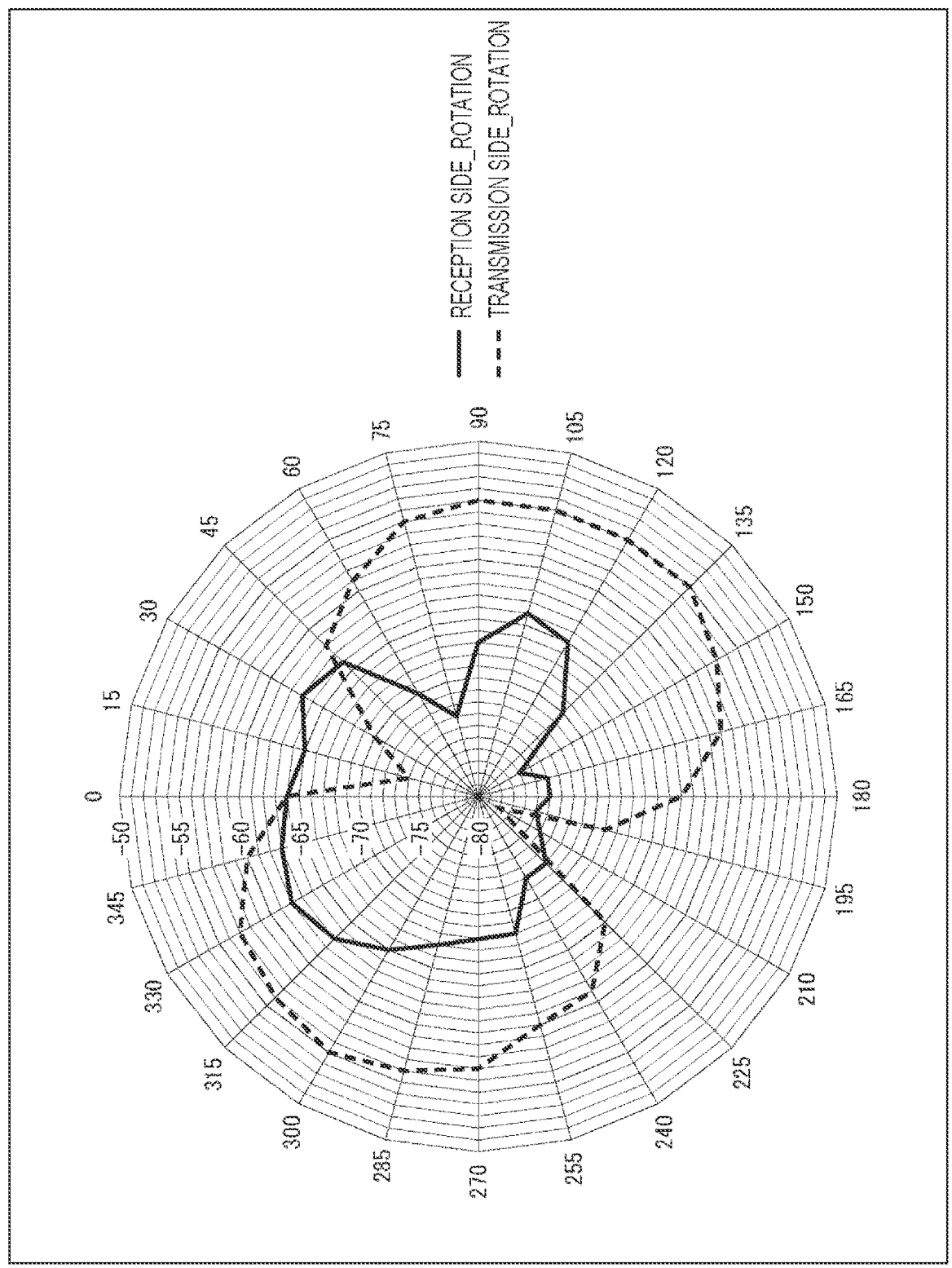
FIG. 4 is a diagram illustrating an example of a result of measuring radiation characteristics.

As illustrated in FIG. 3, FIG. 4 illustrates a result of measuring radiation characteristics in a case where each of the antennas of the receiver Rx (reception side) and a transmitter Tx (transmission side) is rotated arbitrarily.

A of FIG. 3 illustrates a state where the antennas of the receiver Rx and transmitter Tx face each other (0 degrees), B of FIG. 3 illustrates a state where the antenna of the receiver Rx is rotated by, for example, 90 degrees, and C of FIG. 3 illustrates a state where the antenna of the transmitter Tx is rotated by, for example, 90 degrees.

FIG. 4 illustrates a radiation characteristic (solid line) in a case where the antenna of the receiver Rx (reception side) is rotated, and a radiation characteristic (broken line) in a case where the antenna of the transmitter Tx (transmission side) is rotated.

As illustrated in FIG. 4, regardless of which antenna is rotated, reception intensity changes by about 10 dB to 20 dB depending an angle (orientation) of the antenna. That is, a large error occurs in a distance measurement result depending on the angle of the antenna.

It is known that, in positioning using ToF, distance measurement is performed by utilizing a change in propagation time of a wireless signal. ToF is also used in Ultra Wide Band (UWB) or the like, and is known to be able to obtain extremely high distance measurement accuracy.

However, there is a problem with a distance measurement technique using wireless communication using a narrow bandwidth.

Figure 5:
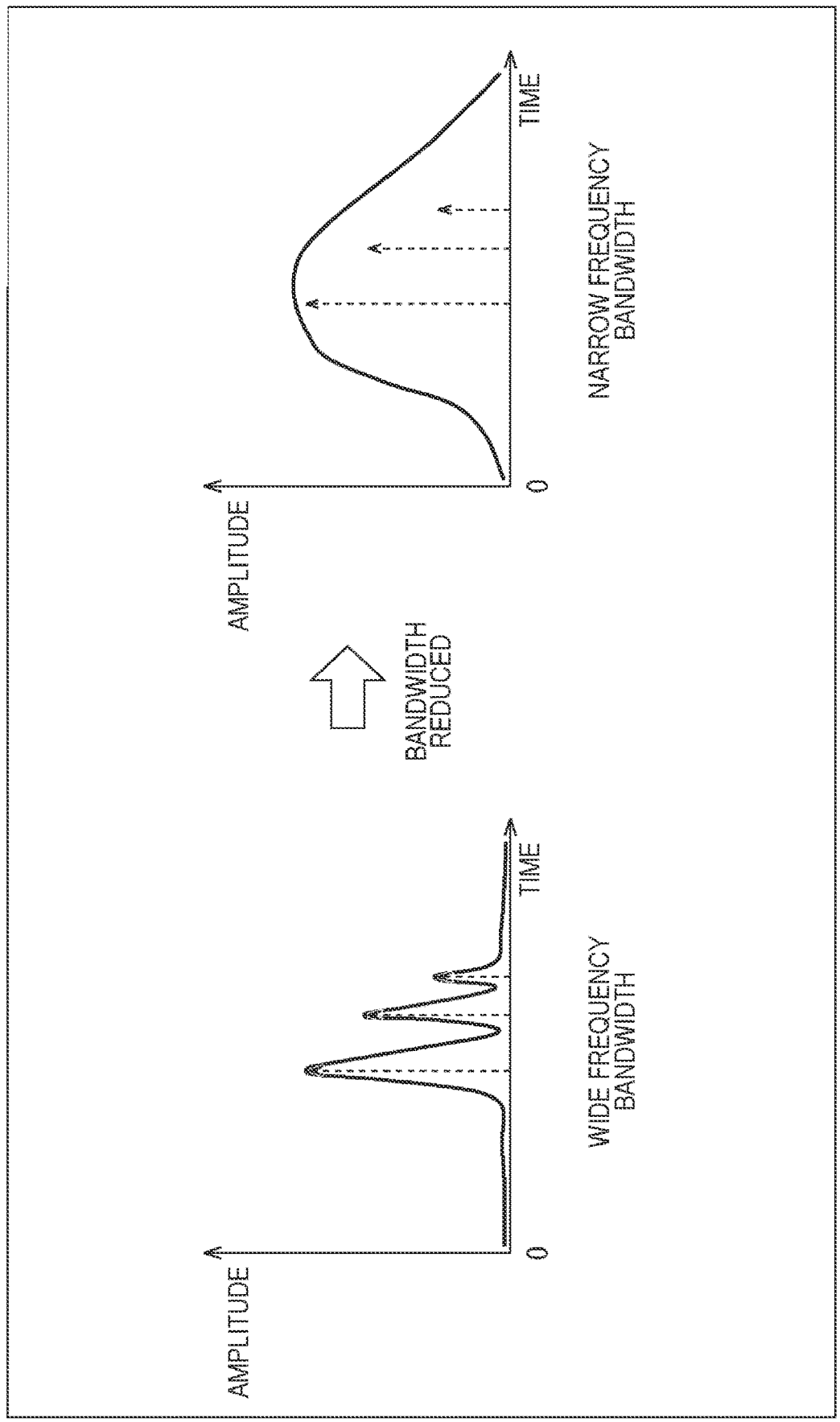
FIG. 5 is a diagram describing a difference in an arrival waveform depending on a bandwidth used.

Specifically, in communication such as UWB that uses a wide frequency bandwidth of 500 MHz to a few GHz, as illustrated on a left side of FIG. 5, a reception signal (amplitude) can be separated into a main wave (first wave), which is indicated by a longest broken-line arrow, and reflected waves (second and third waves). In this case, distance can be calculated accurately by calculating arrival time of the main wave.

Meanwhile, for example, a maximum bandwidth used in BLE is about 80 MHz, and a maximum bandwidth used in LTE advance is about 160 MHz, and the bandwidths used in these communications are narrow. Therefore, as illustrated on a right side of FIG. 5, a waveform of a reception signal (amplitude) looks like a mixture of a plurality of waves, and calculation of arrival time of the main wave is difficult. As a result, distance measurement accuracy is reduced.

In order to solve these problems, various distance measurement techniques have been proposed by wireless standards organizations or the like. One of the techniques is a distance measurement technique with a phase-based method.

Figure 6:
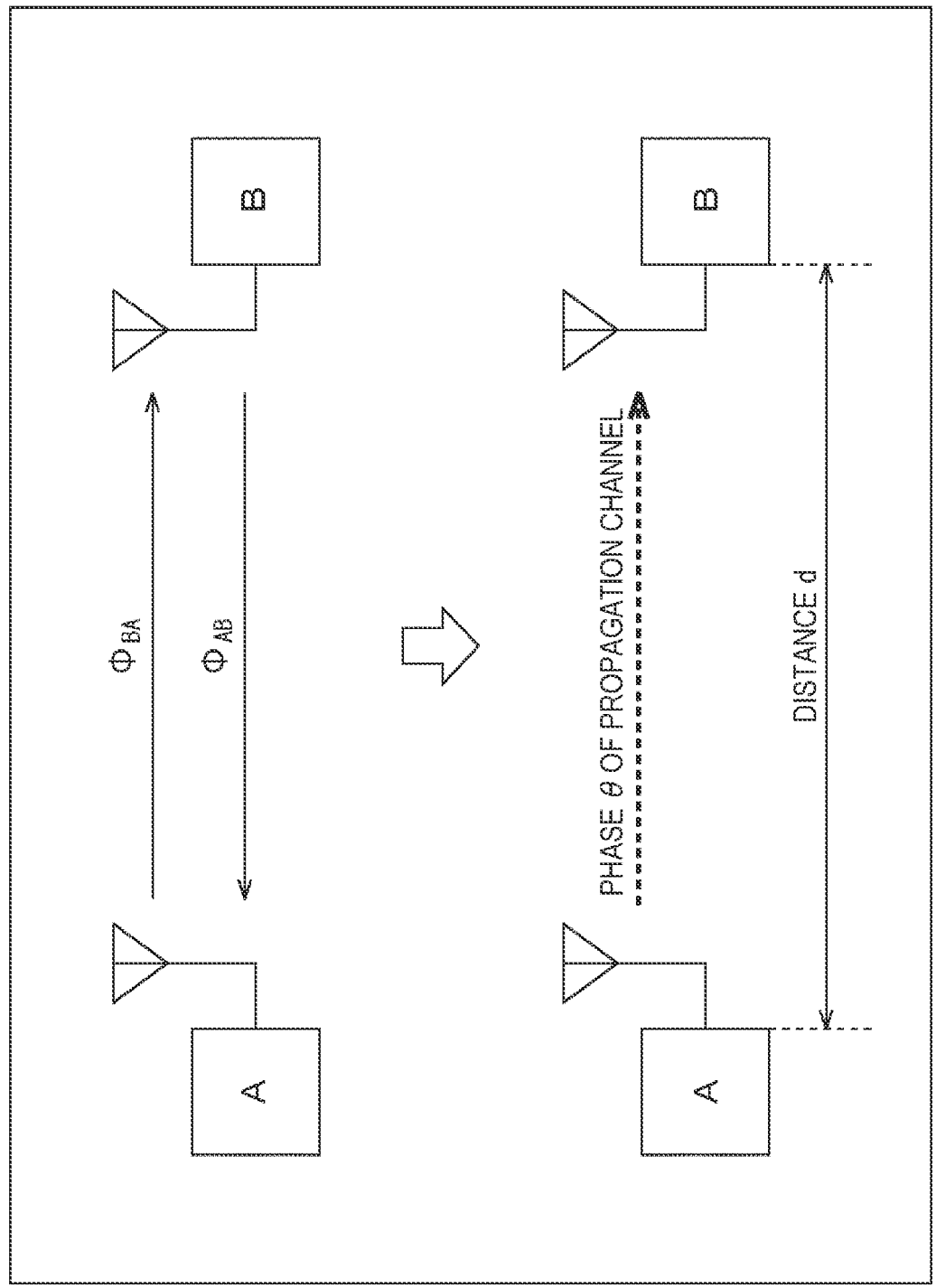
FIG. 6 is a diagram describing distance measurement with a phase-based method.

In distance measurement with the phase-based method, as illustrated in FIG. 6, a distance d between a device A and a device B is calculated on the basis of a phase $\theta$ of a propagation channel calculated from a phase $\varphi_{BA}$ of a transmission signal from the device A to the device B, and a phase $\varphi_{AB}$ of a reception signal from the device B to the device A.

Here, details of distance measurement with the phase-based method will be described with reference to FIG. 7.

Figure 7:
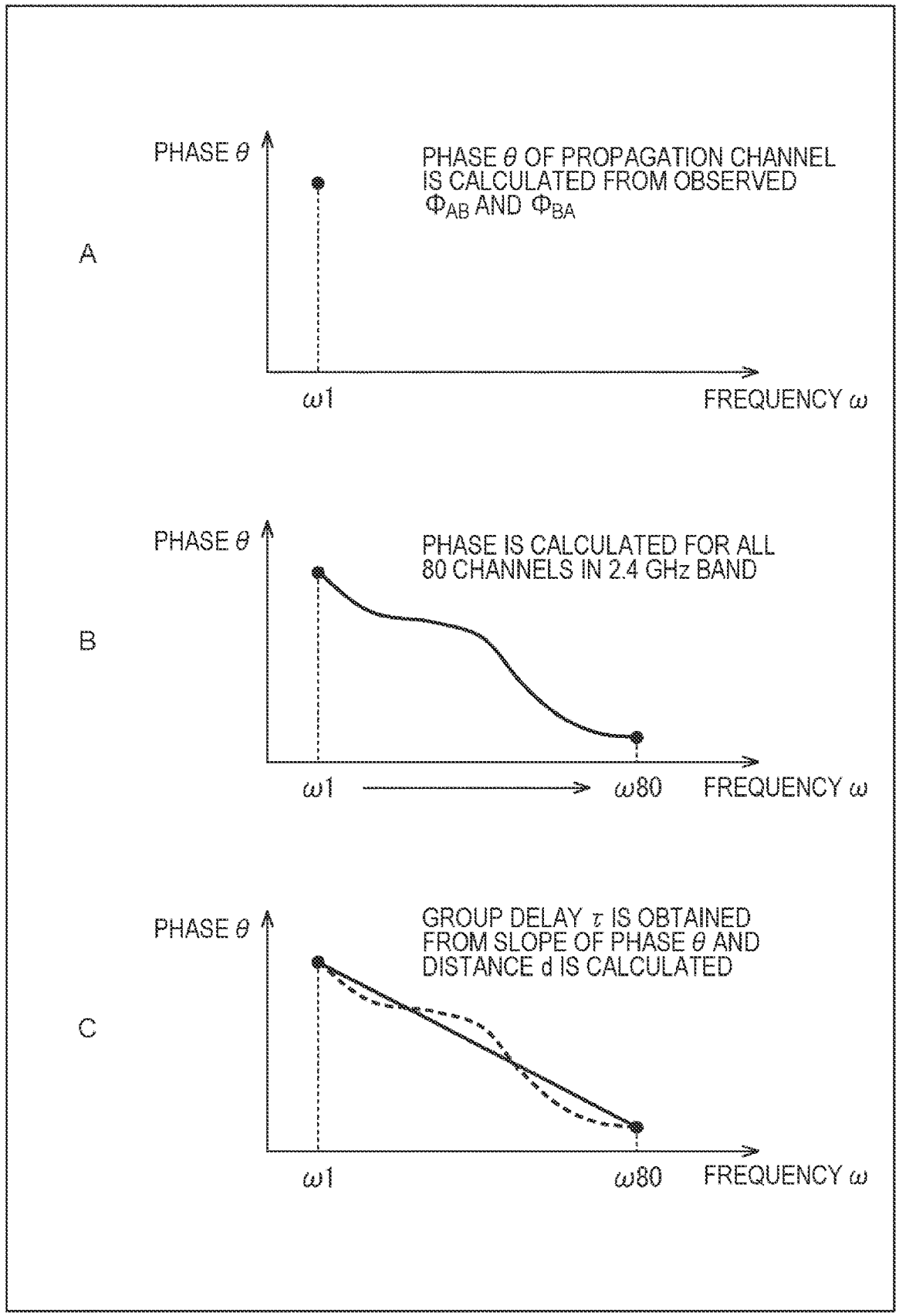
FIG. 7 is a diagram describing details of distance measurement with the phase-based method.

First, as illustrated in A of FIG. 7, the phase $\theta$ of the propagation channel is calculated from the observed phases $\varphi_{BA}$ and $\varphi_{AB}$ obtained by observing the phase $\varphi_{BA}$ of the transmission signal and the phase $\varphi_{AB}$ of the reception signal for a certain frequency $\omega 1$.

Similarly, as illustrated in B of FIG. 7, the phase $\theta$ is calculated for all 80 channels in a 2.4 GHz band. Although it is assumed in B of FIG. 7 that the phase $\theta$ is calculated for the 80 channels in steps of 1 MHz from 2.4 GHz to 2.48 GHz, the frequency bandwidth (frequency range) and the number of channels (the number of steps) from which the phase $\theta$ is calculated are not limited thereto.

Then, as illustrated in C of FIG. 7, a group delay $\tau$ is calculated from a slope of the phase $\theta$ for each frequency, and the distance d is calculated by multiplying the group delay $\tau$ by the light speed.

Because this phase-based method uses the slope of the phase $\theta$ for each frequency, the method can be said to be a technique for calculating a distance on the basis of a frequency characteristic (relative difference information of frequency) of a propagation channel. Therefore, there is an advantage that the calculated distance does not depend on an absolute value of a circuit delay of each block, variation in temperature characteristic, or the like.

However, there is a problem that distance measurement with the phase-based method is also affected by multipaths.

Figure 8:
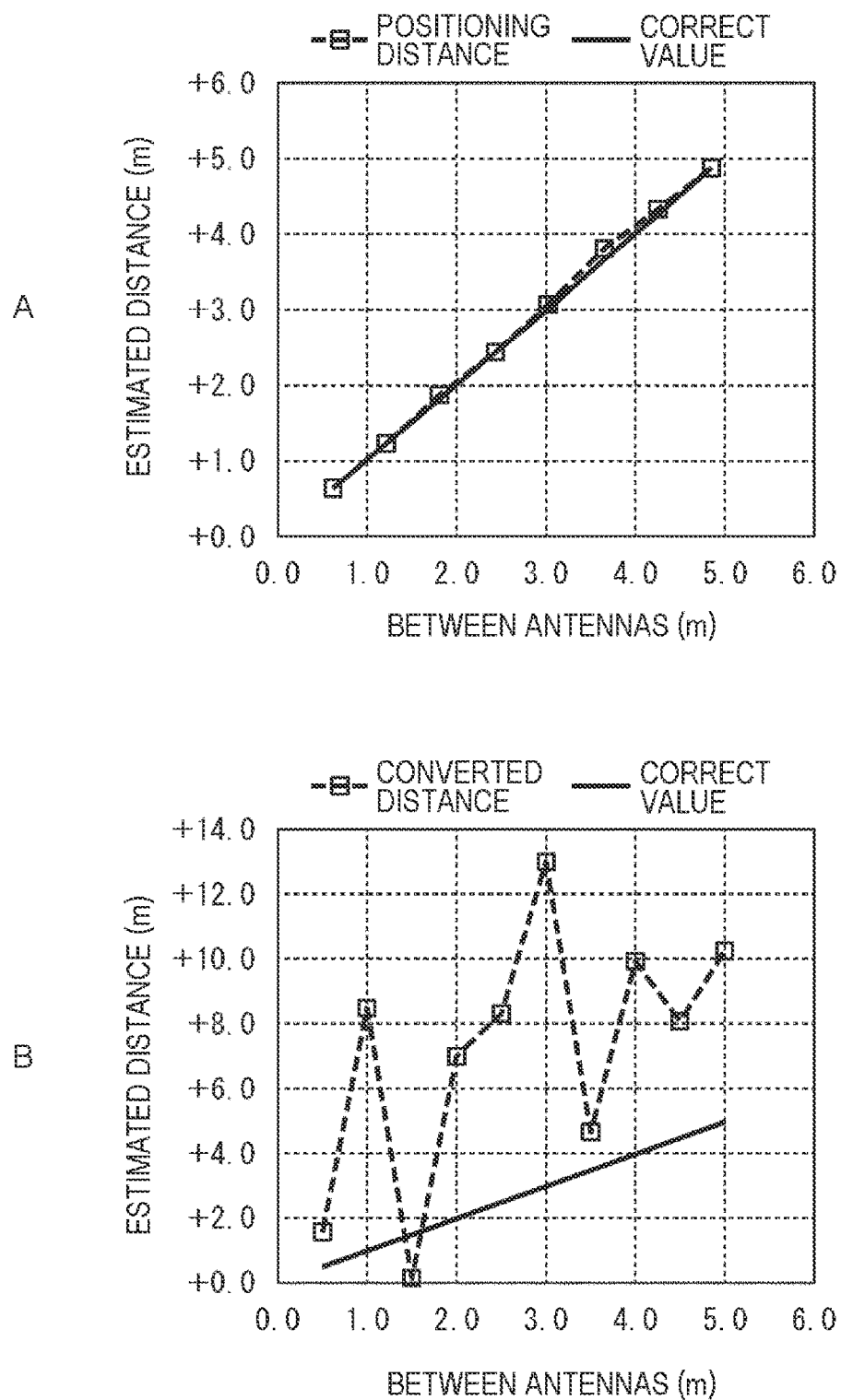
FIG. 8 is a diagram illustrating examples of a result of measuring distance measurement performance.

FIG. 8 is a diagram illustrating examples of a result of evaluating distance measurement with the phase-based method.

A of FIG. 8 illustrates distance values measured in the non-multipath environment with no obstacle (Location 1) and a straight line representing the correct values, and B of FIG. 8 illustrates distance values measured in the multipath environment with many obstacles (Location 2) and a straight line representing the correct values (converted values).

In the non-multipath environment with no obstacle, a highly accurate distance measurement result (close to the correct values) is obtained, as illustrated in A of FIG. 8. Meanwhile, in the multipath environment with many obstacles, a distance measurement result showing great distance calculation errors (far from the correct values) is obtained, as illustrated in B of FIG. 8. In this way, even in the distance measurement with the phase-based method, a phase changes significantly by being affected by multipaths, and distance measurement accuracy is reduced.

Accordingly, in the present embodiment, a configuration capable of maintaining distance measurement accuracy even in a multipath environment is implemented.

(1-2. Configurations of Communication Terminal and Communication Module)

Figure 9:
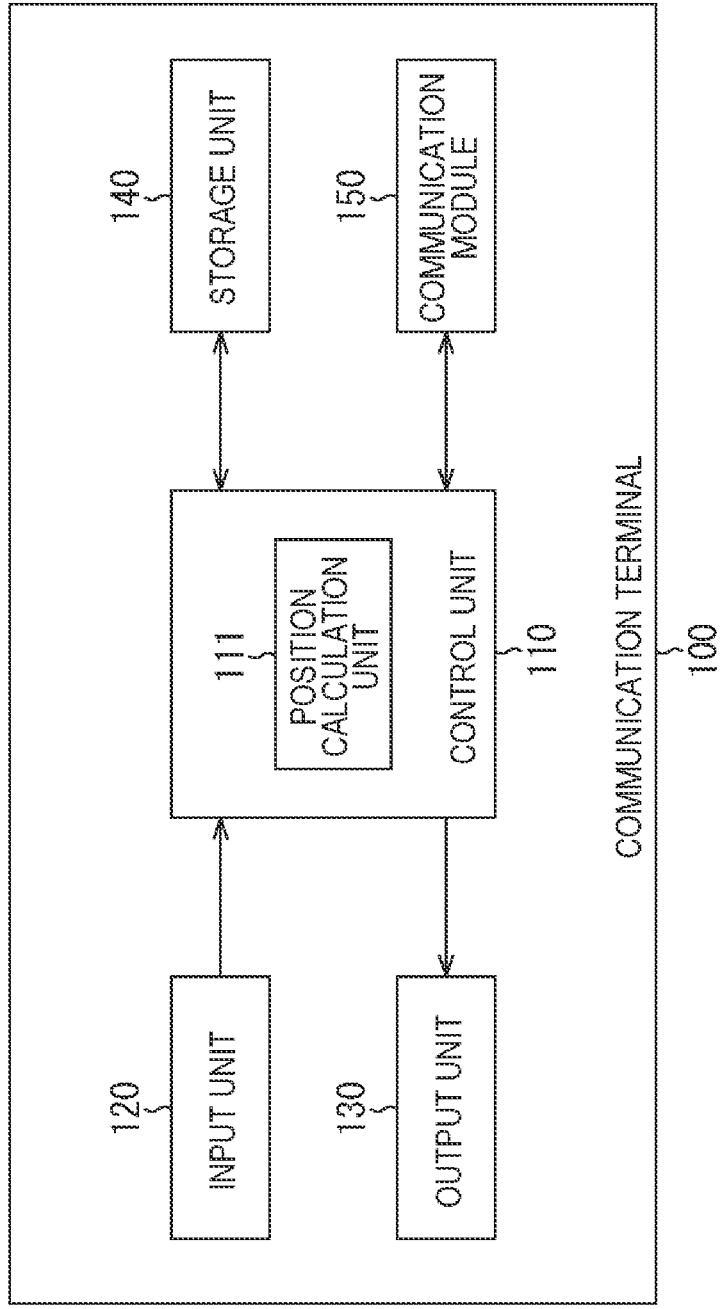
FIG. 9 is a block diagram illustrating a configuration example of a communication terminal to which the technology according to the present disclosure is applied.

FIG. 9 is a block diagram illustrating a configuration example of a communication terminal to which the technology according to the present disclosure is applied.

A communication terminal 100 illustrated in FIG. 9 includes a control unit 110, an input unit 120, an output unit 130, a storage unit 140, and a communication module 150. The communication terminal 100 is configured as, for example, a smartphone or the like.

The control unit 110 includes a central processing unit (CPU), or the like. The control unit 110 implements various functions (for example, a display function, an audio output function, or the like) by executing a program that implements an operating system (OS) or predetermined application held in the storage unit 140.

Furthermore, the control unit 110 implements a position calculation unit 111 that calculates position information representing a position of a self-device (communication terminal 100) by executing a program.

The input unit 120 includes, for example, various keys or buttons, a touch panel, and a microphone, and detects input of various data.

The output unit 130 includes a display such as a liquid crystal display (LCD) or an organic light emitting diode (OLED) for example, and a speaker, and outputs various data. A display included in the output unit 130 and a touch panel included in the input unit 120 may be integrally configured.

The storage unit 140 includes, for example, a read only memory (ROM) and a random access memory (RAM), and holds various data or programs, setting information, or the like. Note that the control unit 110 may have the storage unit 140 built in.

The communication module 150 is configured as a wireless communication IC or the like such as a BLE chip, and executes control related to wireless communication performed with a peripheral communication apparatus (for example, a beacon device, another communication terminal, or the like).

For example, the communication module 150 performs wireless communication with a communication apparatus to communicate with to calculate distance information representing a distance to the communication apparatus, and supplies the distance information to the control unit 110. The position calculation unit 111 of the control unit 110 can calculate position information by using distance information from the communication module 150 and reliability level information, which will be described later.

Figure 10:
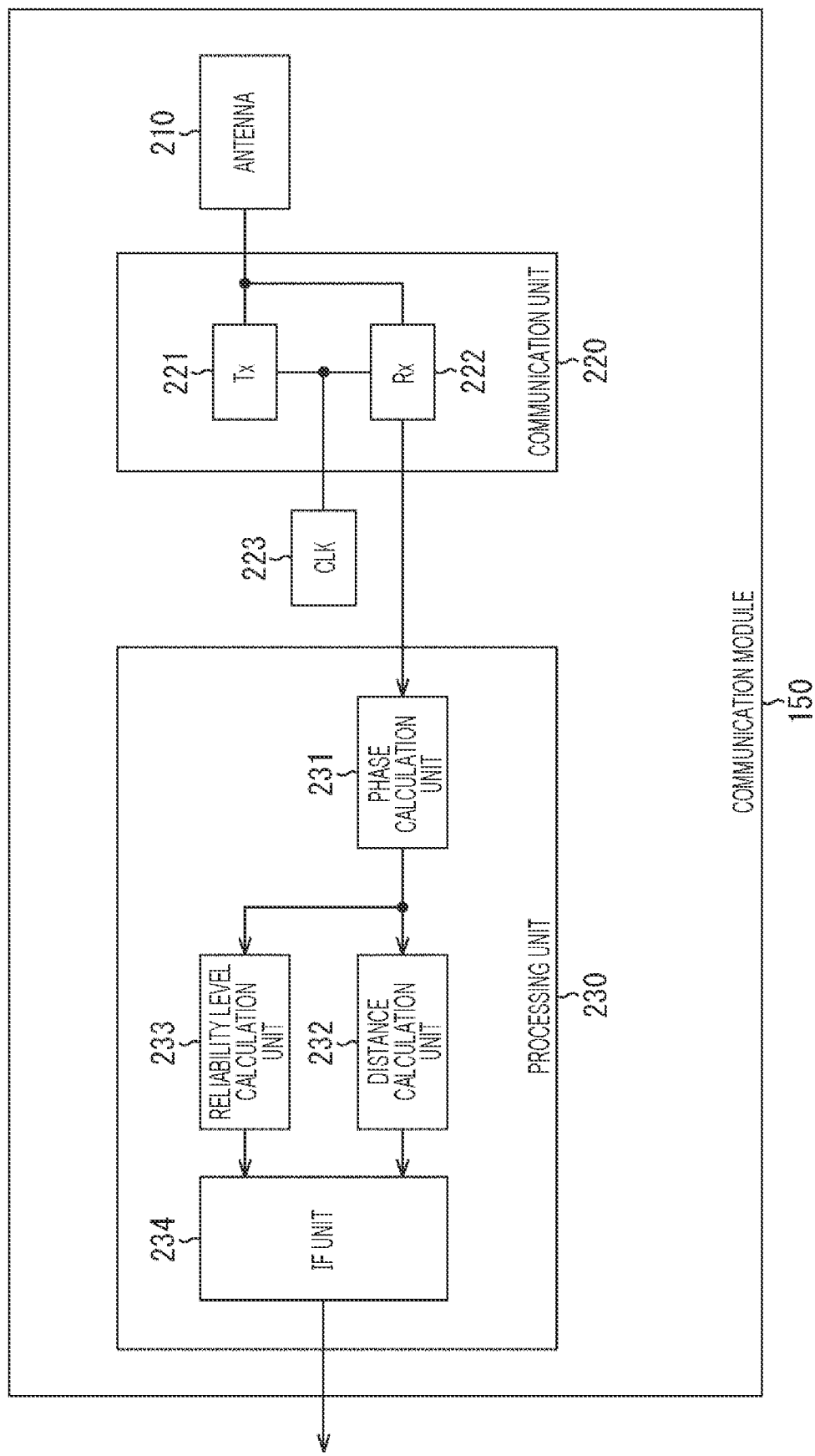
FIG. 10 is a block diagram illustrating a functional configuration example of a communication module.

FIG. 10 is a block diagram illustrating a functional configuration example of the communication module 150.

The communication module 150 includes an antenna 210, a communication unit 220, and a processing unit 230.

The communication unit 220 performs wireless communication in a bandwidth of 160 MHz or less. Specifically, the communication unit 220 performs wireless communication with at least any one of BLE, Wi-Fi, or LTE.

The communication unit 220 includes a transmitter 221 and a receiver 222, and performs wireless communication with a peripheral communication apparatuses via the antenna 210. The transmitter 221 transmits a transmission signal by synchronizing with a clock generated by an oscillator 223. The receiver 222 receives a reception signal by synchronizing with the clock generated by the oscillator 223.

The processing unit 230 includes a phase calculation unit 231, a distance calculation unit 232, a reliability level calculation unit 233, and an interface (IF) unit 234, and outputs, on the basis of a frequency characteristic of a propagation channel, information of a distance to a communication apparatus to communicate with, and reliability level information representing a reliability level of the distance information.

The phase calculation unit 231 calculates the phase (phase value) of the propagation channel for each frequency on the basis of the phase of the transmission signal transmitted from the transmitter 221 and the phase of the reception signal received by the receiver 222. The calculated phase value for each frequency is supplied to the distance calculation unit 232 and the reliability level calculation unit 233.

The distance calculation unit 232 calculates, on the basis of the phase value for each frequency calculated by the phase calculation unit 231, information of the distance to the communication apparatus to communicate with, and supplies the distance information to the IF unit 234.

The reliability level calculation unit 233 calculates reliability level information representing a reliability level of the distance information calculated by the distance calculation unit 232 on the basis of the phase value for each frequency calculated by the phase calculation unit 231, and supplies the reliability level information to the IF unit 234.

The IF unit 234 outputs the distance information from the distance calculation unit 232 and the reliability level information from the reliability level calculation unit 233 to the control unit 110.

(1-3. Calculation of Distance Information)

Figure 11:
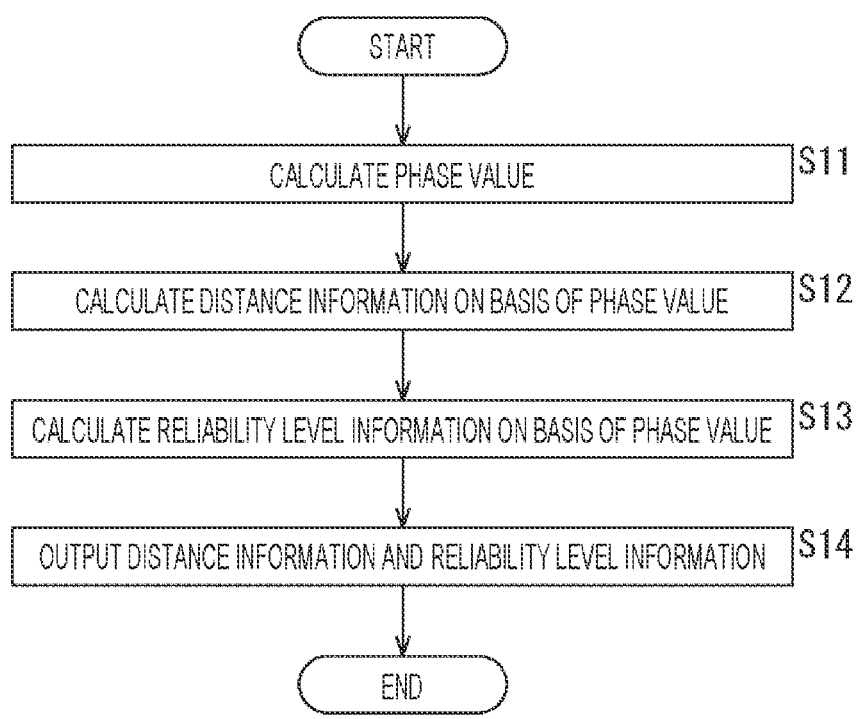
FIG. 11 is a flowchart describing processing of calculating distance information.

Next, processing of calculating distance information by the communication module 150 will be described with reference to the flowchart in FIG. 11.

In Step S11, according to the phase-based method described above, the phase calculation unit 231 of the processing unit 230 calculates the phase value of the propagation channel for each frequency on the basis of the phase of the transmission signal transmitted from the communication unit 220, and the phase of the reception signal received by the communication unit 220.

In Step S12, on the basis of the phase value for each frequency, the distance calculation unit 232 of the processing unit 230 calculates information of the distance to the communication apparatus to communicate with. Specifically, the distance calculation unit 232 calculates a group delay from a slope of the phase value (phase slope value) within a certain frequency range, and calculates distance information by multiplying the group delay by light speed.

In Step S13, the reliability level calculation unit 233 of the processing unit 230 calculates, on the basis of the phase value for each frequency, reliability level information representing a reliability level of the distance information calculated by the distance calculation unit 232.

In Step S14, the IF unit 234 of the processing unit 230 outputs the distance information calculated by the distance calculation unit 232 and the reliability level information calculated by the reliability level calculation unit 233 to the control unit 110.

Distance measurement using a conventional RSSI and distance measurement with the phase-based method differ in whether the distance information is calculated from one value or from a plurality of values. With the phase-based method, a phase value is calculated for each frequency, and therefore, it is easy to judge whether or not finally calculated distance information is reliable.

Here, a difference between a phase value calculated in the non-multipath environment and a phase value calculated in the multipath environment will be described.

Figure 12:
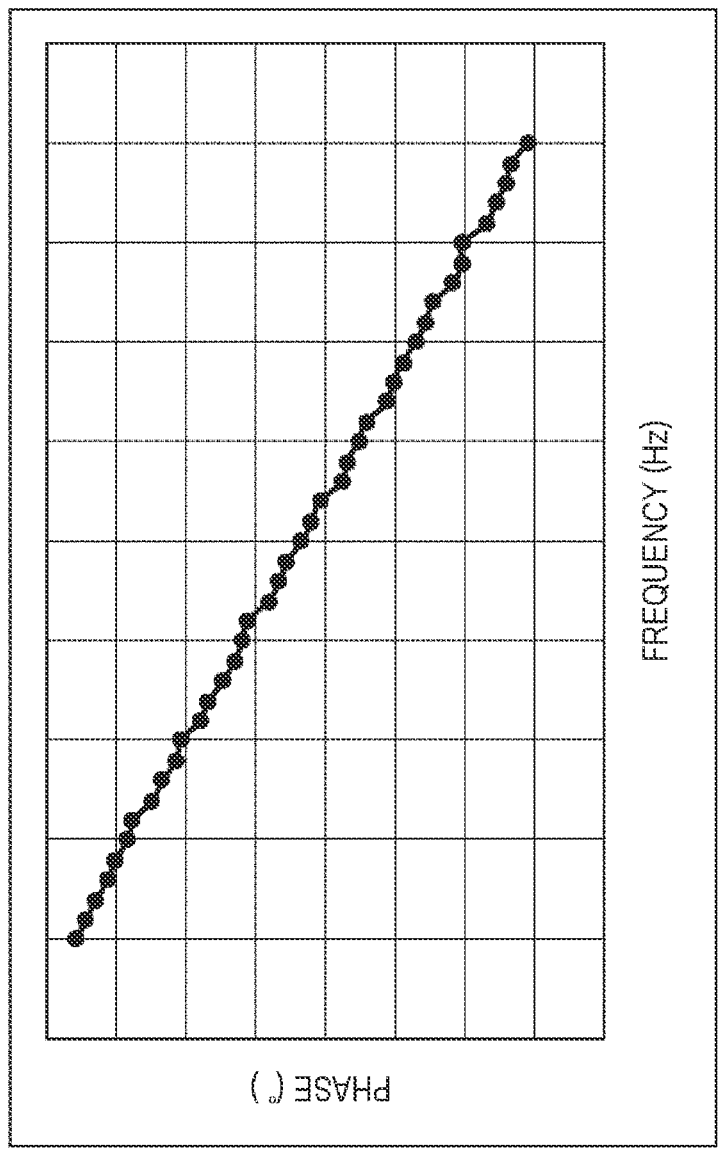
FIG. 12 is a diagram illustrating an example of a phase value in a non-multipath environment.
Figure 13:
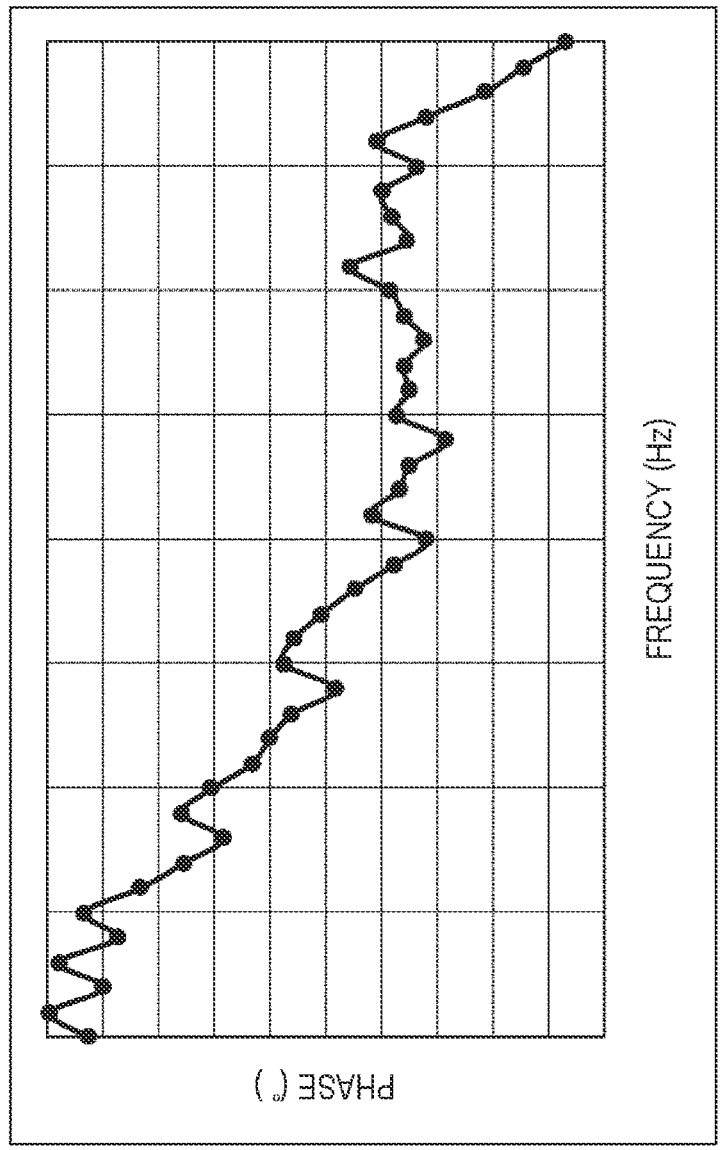
FIG. 13 is a diagram illustrating an example of a phase value in a multipath environment.

FIG. 12 is a diagram illustrating an example of a phase value calculated in the non-multipath environment, and FIG. 13 is a diagram illustrating an example of a phase value calculated in the multipath environment. It is assumed that measurement is performed for the same distance in both the environments.

As illustrated in FIG. 12, in the non-multipath environment, an amount of change (slope) of the phase values with respect to frequency is close to constant. Meanwhile, as illustrated in FIG. 13, in the multipath environment, an amount of change (slope) of the phase values with respect to frequency fluctuates greatly. That is, it can be said that there is a large difference in stability of the slope of the phase values between the non-multipath environment and the multipath environment.

Figure 14:
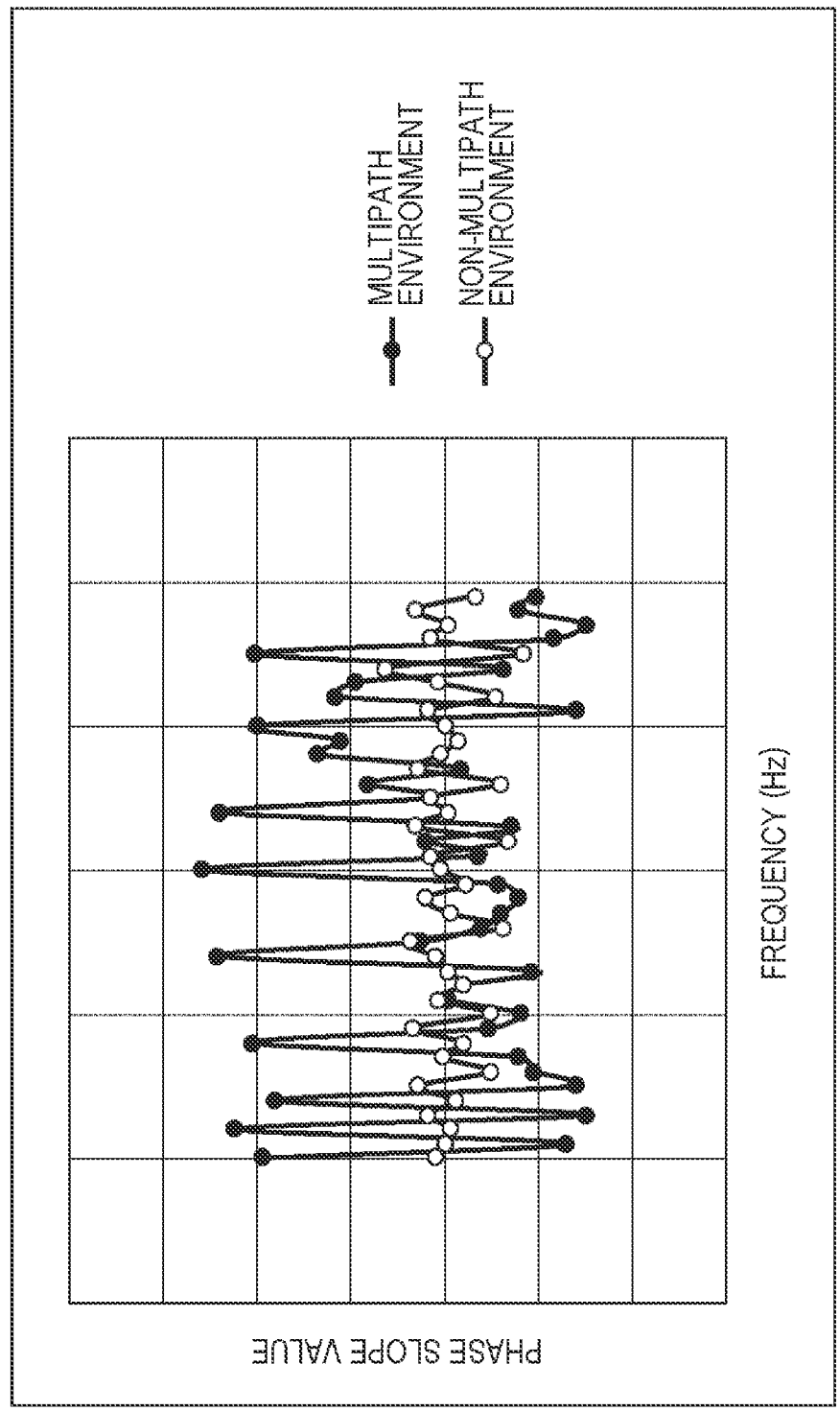
FIG. 14 is a diagram illustrating an example of a phase slope value.

FIG. 14 is a diagram comparing the phase slope values, which are the slopes of the phase values in the respective non-multipath environment and multipath environment.

As illustrated in FIG. 14, because fluctuations in the phase slope values in the non-multipath environment is small, it can be said that a reliability level of the phase value for each frequency, that is, a reliability level of distance information, is high. Meanwhile, because the fluctuations in the phase slope values in the multipath environment are large, it can be said that a reliability level of distance information is low.

Accordingly, the reliability level calculation unit 233 can calculate reliability level information of a distance information on the basis of fluctuations in the phase slope values within a predetermined frequency range.

For example, as the reliability level information, dispersion of the phase slope values may be calculated, or a moving average of the phase slope values may be calculated.

Furthermore, these values may be calculated excluding a portion where the fluctuation is large in the phase slope values.

Moreover, reliability level information output from the processing unit 230 may be the calculated value itself, or may be, for example, a result of determining the value with a preset threshold value, such as high, medium, or low.

Furthermore, the reliability level information may be a result of artificial intelligence (AI) determining a reliability level of the data on the basis of big data corresponding to data of the phase values for each frequency illustrated in FIGS. 12 and 13, or data of the phase slope values illustrated in FIG. 14.

Moreover, as the reliability level information, information obtained in a process of calculating a phase value at each frequency may be used.

For example, as a technique for calculating a phase value, there is a technique for calculating a phase value on the basis of a balance of amplitude of I/Q data obtained by demodulating a reception signal. In this technique, when a multipath wave (reflected wave) is included in a reception signal, a constellation represented on an I-Q plane is in an elliptical shape.

Figure 15:
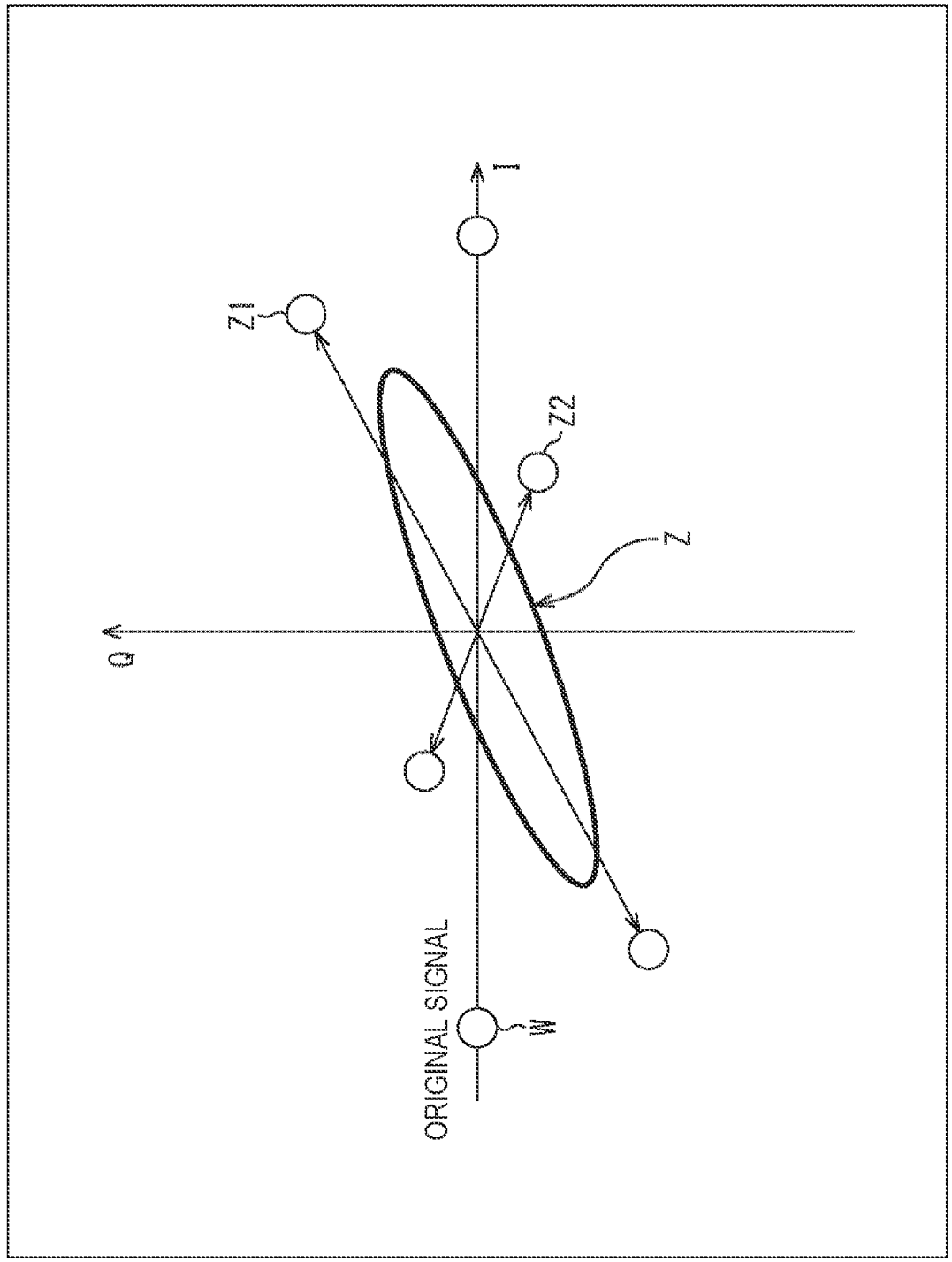
FIG. 15 is a diagram illustrating an example of a constellation.

FIG. 15 is a diagram illustrating an example of a constellation.

In the example in FIG. 15, a signal point W representing an original signal is disposed on an I axis. In this way, a signal that does not include a multipath wave is represented by a straight line.

Meanwhile, in the example in FIG. 15, because a reception signal Z includes a multipath wave Z1 of a first path and a multipath wave Z2 of a second path, the reception signal Z is represented by an ellipse. The reception signal Z tends to be close to a perfect circle as the number of multipath waves included increases.

Accordingly, reception intensity of a demodulation signal obtained by demodulating a reception signal may be used as is as reliability level information.

According to the above processing, information of a distance to a communication apparatus to communicate with, and reliability level information representing a reliability level of the distance information are output on the basis of a frequency characteristic of a propagation channel, and therefore, adaptive positioning is possible. Specifically, it is possible to improve positioning accuracy by positioning using distance information of a high reliability level.

(1-4. Calculation of Position Information)

Hereinafter, an example of calculating position information of the self-device on the basis of the above-described distance information and reliability level information will be described.

Three-point positioning is known as a technique for calculating position information of the self-device by using a distance measurement result.

Figure 16:
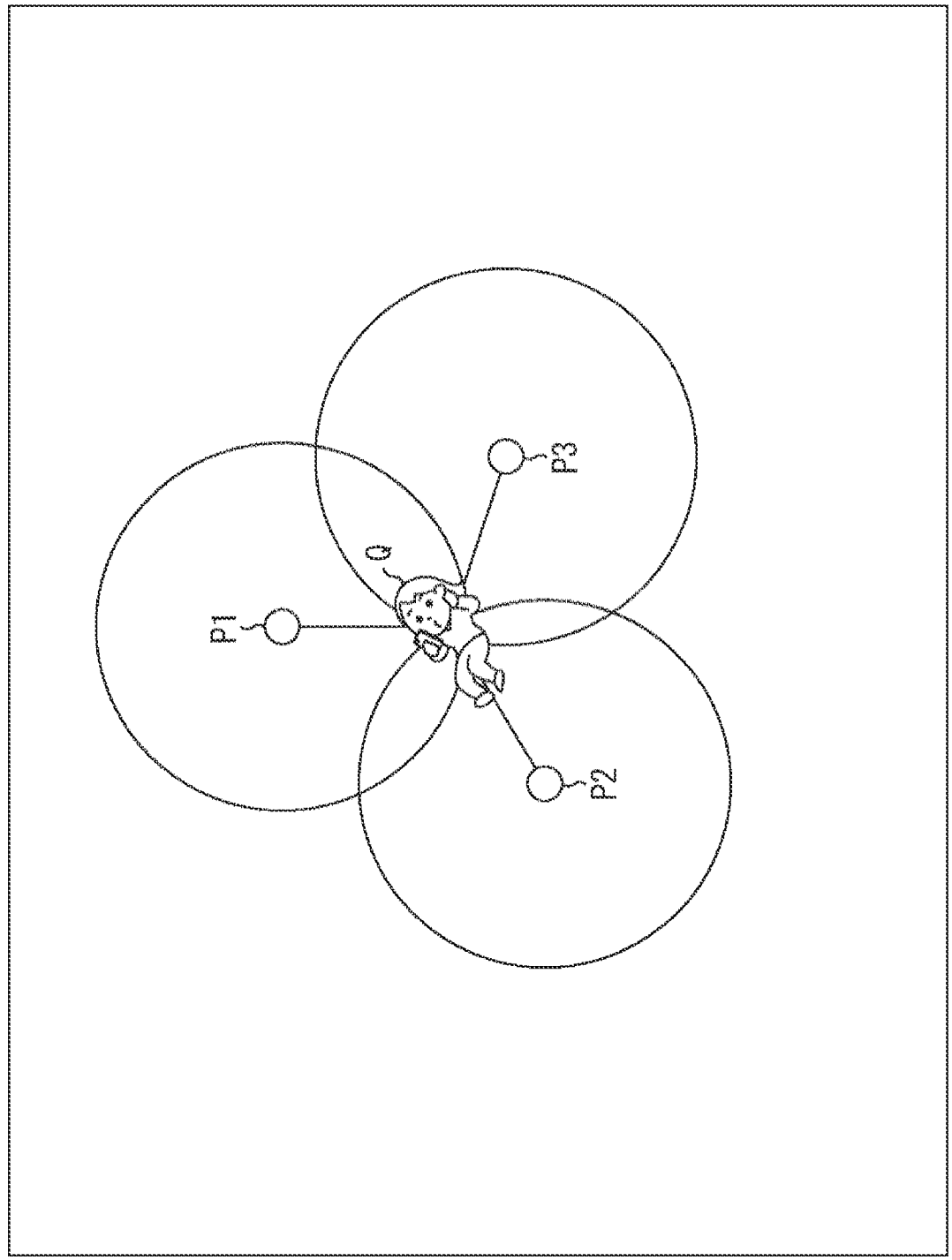
FIG. 16 is a diagram illustrating an example of three-point positioning.

FIG. 16 is a diagram illustrating an example of three-point positioning.

The three-point positioning is a technique for obtaining, on the basis of distances to respective three known coordinates P1, P2, and P3, a position Q of a user who owns the communication terminal 100. A communication apparatus such as a beacon device is disposed at each of the coordinates P1, P2, and P3.

In the example in FIG. 16, position information of the communication terminal 100 is calculated on the basis of information of a distance between the communication terminal 100 at the position Q and each of the coordinates P1, P2, and P3. Note that a communication apparatus such as a beacon device is actually disposed not only at each of the three points but also at many positions, and position information is calculated on the basis of each distance information.

Moreover, in the present embodiment, in addition to the distance information, reliability level information about the distance information is calculated.

Figure 17:
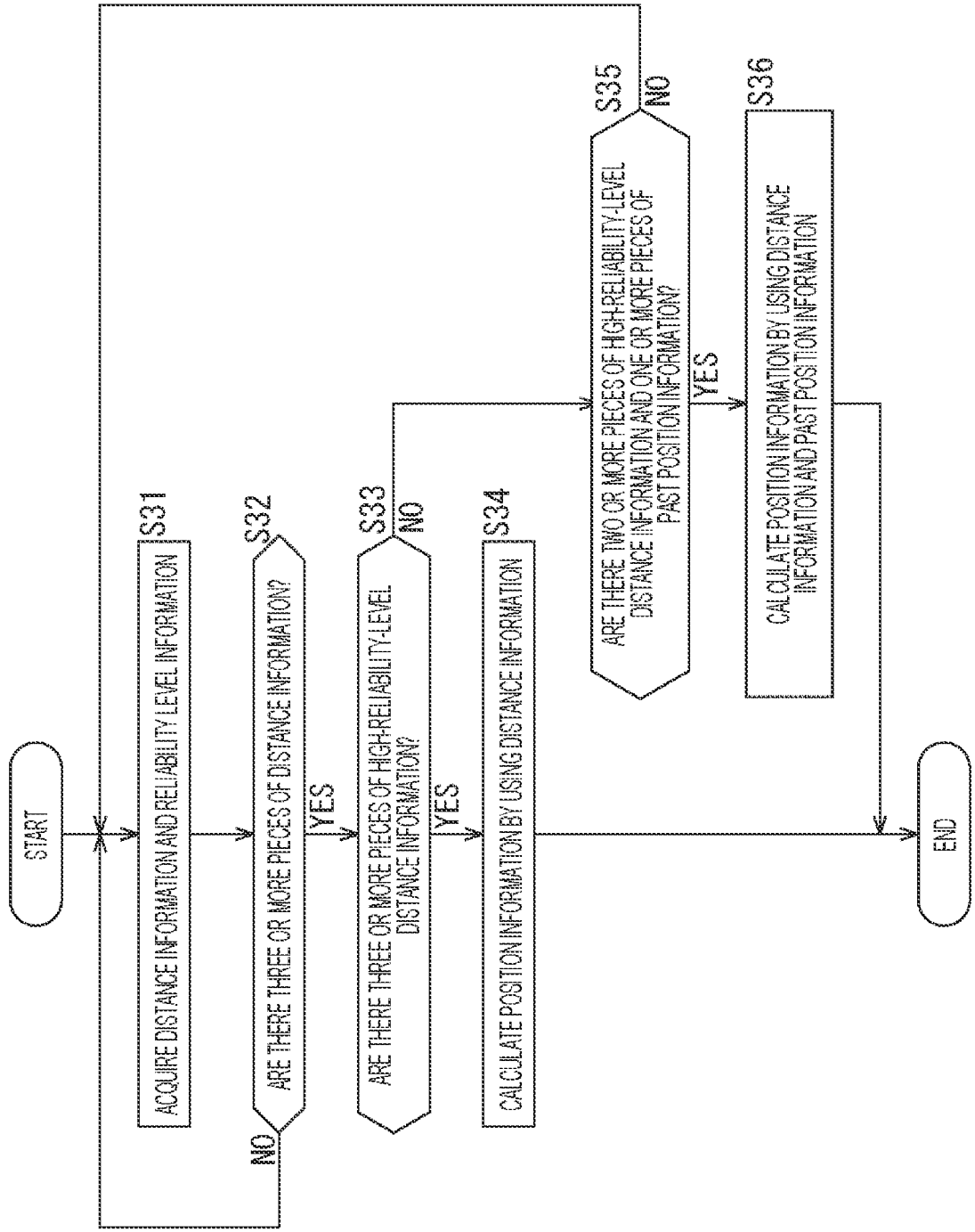
FIG. 17 is a flowchart describing processing of calculating position information.

Accordingly, processing of calculating position information based on distance information and reliability level information will be described with reference to the flowchart in FIG. 17. The processing in FIG. 17 is executed by the position calculation unit 111 of the control unit 110.

In Step S31, the position calculation unit 111 acquires the distance information and reliability level information output by the processing unit 230. The distance information and the reliability level information are acquired as many as the number of communication apparatuses to communicate with.

In Step S32, the position calculation unit 111 determines whether or not there are three or more pieces of distance information.

In a case where there are not three or more pieces of distance information, Steps S31 and S32 are repeated until three or more pieces of distance information are acquired.

Meanwhile, in a case where there are three or more pieces of distance information, the processing proceeds to Step S33, and the position calculation unit 111 determines whether or not there are three or more pieces of high-reliability-level distance information. The high-reliability-level distance information is distance information of which a reliability level represented by reliability level information is higher than, for example, a predetermined value.

In a case where there are three or more pieces of high-reliability-level distance information, the processing proceeds to Step S34, and the position calculation unit 111 calculates position information by using the high-reliability-level distance information.

Figure 18:
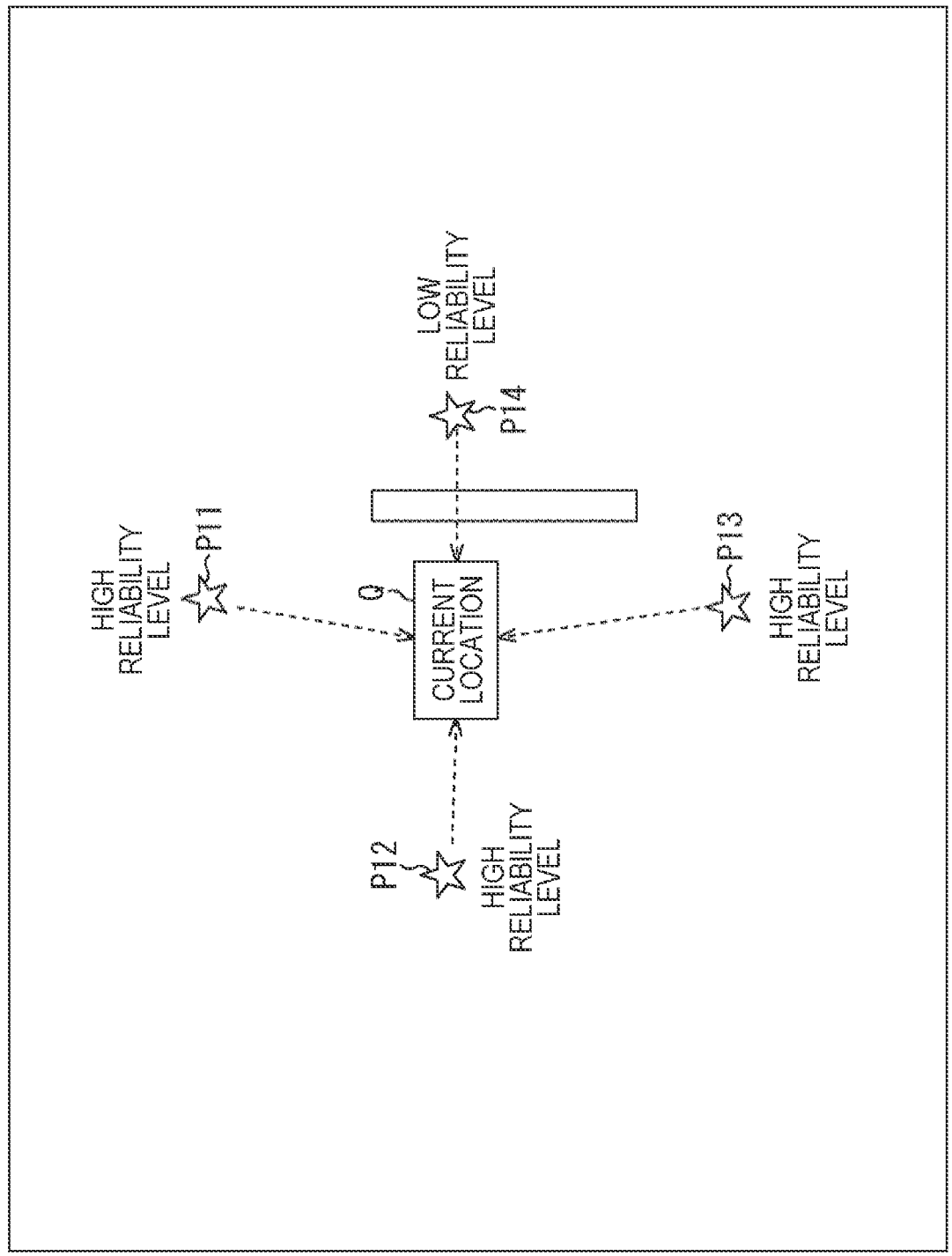
FIG. 18 is a diagram illustrating an example of three-point positioning using reliability level information.

For example, as illustrated in FIG. 18, it is assumed that information of a distance to each of coordinates P11, P12, P13, and P14, and reliability level information of the distance information are acquired. In the example in FIG. 18, of four pieces of distance information, information of a distance to each of the coordinates P11, P12, and P13 is regarded as high-reliability-level distance information, and information of a distance to the coordinates P14 is regarded as low-reliability-level distance information.

In the example in FIG. 18, in a case where position information is calculated by using the information of a distance to the coordinates P14 of a low reliability level, there is a possibility that positioning accuracy is reduced. Accordingly, position information of a position Q is calculated by using information of a distance to each of the coordinates P11, P12, and P13 of a high reliability level.

With this arrangement, distance measurement accuracy can be maintained without reducing positioning accuracy even in a multipath environment.

Now, returning to the flowchart in FIG. 17, in a case where it is determined in Step S33 that there are not three or more pieces of high-reliability-level distance information, the processing proceeds to Step S35.

In Step S35, the position calculation unit 111 determines whether or not there are two or more pieces of high-reliability-level distance information and one or more pieces of past position information.

In a case where there are two or more pieces of high-reliability-level distance information and one or more pieces of past position information, the processing proceeds to Step S36, and the position calculation unit 111 calculates position information by using the high-reliability-level distance information and the past position information.

The position information is calculated at predetermined time intervals, and therefore can be managed in time series. Accordingly, by finding a moving average or the like with respect to the position information in time series, it is possible to prevent unnatural change in position represented by the position information.

Therefore, positioning accuracy may be improved by calculating position information by using two or more pieces of high-reliability-level distance information of a high reliability level and a little earlier position information, instead of calculating position information by using distance information of a low reliability level.

According to the above processing, position information can be calculated on the basis of distance information of a high reliability level, and as a result, adaptive positioning is possible.

Note that, although position information is calculated on the basis of three or more pieces of high-reliability-level distance information, or on the basis of two or more pieces of high-reliability-level distance information and one or more pieces of past position information in the processing in FIG. 17, more pieces of distance information or past position information may be used. With this arrangement, positioning with higher accuracy is possible.

Although an example of using three-point positioning has been described above as a technique for calculating position information, another technique may be used.

For example, Angle of Arrival (AoA) is known as a technique for calculating position information.

AoA is a technique for estimating a position by using a plurality of reception antennas to find an angle with respect to an apparatus to communicate with (a direction of the apparatus to communicate with) from a difference in reception time for each of the antennas. Although AoA is also effective in a line-of-sight environment, phase distribution with the reception antennas and an angle of line-of-sight are different in a multipath environment, and therefore, there is a possibility that positioning accuracy is greatly reduced.

Although, normally, distance measurement using the RSSI is performed in AoA, distance measurement with the phase-based method may be performed.

Figure 19:
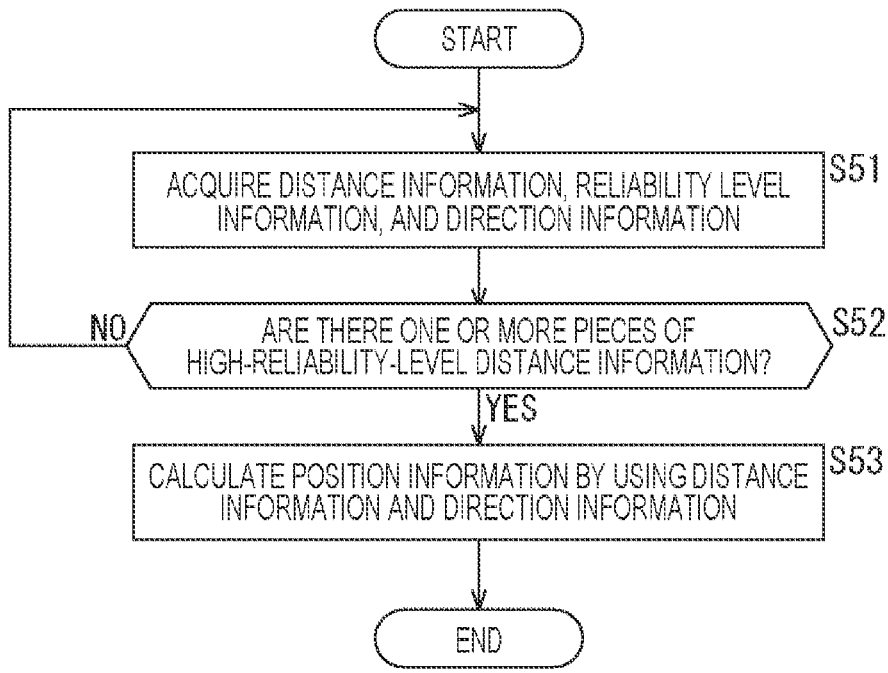
FIG. 19 is a flowchart describing processing of calculating position information.

Here, processing of calculating position information by AoA will be described with reference to the flowchart in FIG. 19.

In Step S51, the position calculation unit 111 acquires direction information representing a direction of a communication apparatus to communicate with, in addition to the distance information and reliability level information output by the processing unit 230.

In Step S52, the position calculation unit 111 determines whether or not there are one or more pieces of high-reliability-level distance information.

In a case where there are not one or more pieces of high-reliability-level distance information, Steps S51 and S52 are repeated until one or more pieces of high-reliability-level distance information are acquired.

Meanwhile, in a case where there are one or more pieces of high-reliability-level distance information, the processing proceeds to Step S53, and the position calculation unit 111 calculates position information by using the high-reliability-level distance information and direction information.

According to the above processing, for example, in a case where a reliability level of the distance information is extremely low, information from another antenna is adopted, information from an antenna of a highest reliability level is adopted, or the like, by which distance measurement accuracy can be maintained even in a multipath environment.

Moreover, in a positioning technique by PDR, one or more pieces of high-reliability-level distance information may be used.

PDR is a technique for positioning by detecting walking of a human and orientation thereof with a combination of an acceleration sensor, a geomagnetic sensor, a gyro sensor, or the like, and finding a locus along which the human has walked (relative change from an initial position).

Here, processing of calculating position information by PDR will be described with reference to the flowchart in FIG. 20.

In Step S71, the position calculation unit 111 acquires locus information representing a locus of the self-device, in addition to the distance information and reliability level information output by the processing unit 230.

In Step S72, the position calculation unit 111 determines whether or not there are one or more pieces of high-reliability-level distance information.

In a case where there are not one or more pieces of high-reliability-level distance information, Steps S71 and S72 are repeated until one or more pieces of high-reliability-level distance information are acquired.

Meanwhile, in a case where there are one or more pieces of high-reliability-level distance information, the processing proceeds to Step S73, and the position calculation unit 111 calculates position information by using the high-reliability-level distance information and locus information.

PDR in which positioning is performed by using existing sensors has a problem that distance measurement errors are accumulated. Therefore, it is desirable that the communication device periodically corrects distance measurement errors, but there is a possibility that the distance information may be erroneously corrected without knowing whether or not distance information is reliable.

Figure 20:
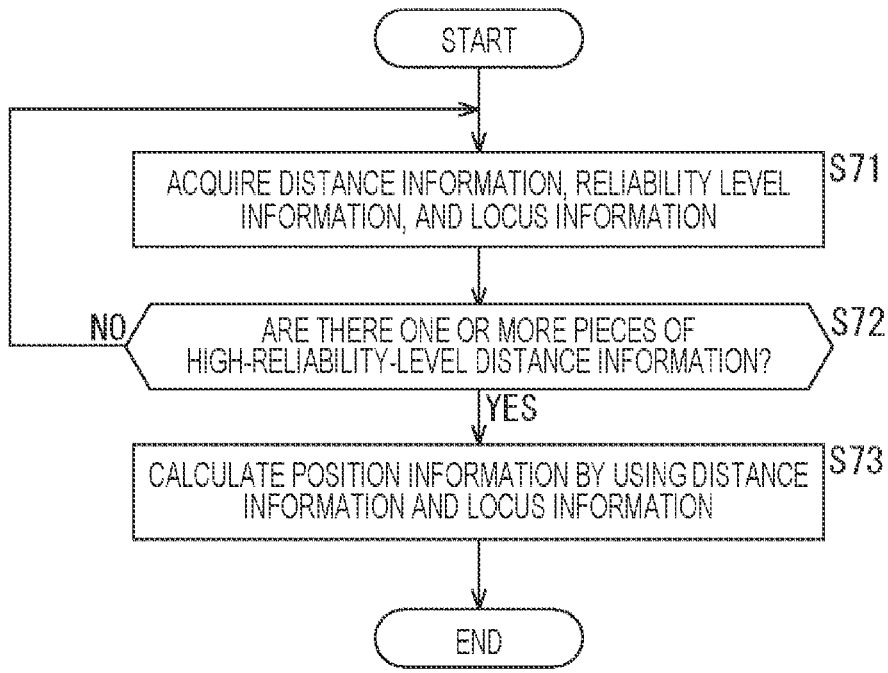
FIG. 20 is a flowchart describing processing of calculating position information.

Accordingly, according to the processing in FIG. 20, position information is calculated by using one or more pieces of high-reliability-level distance information and locus information, and therefore it is not necessary to periodically correct distance measurement errors, and distance measurement accuracy can be maintained.

As described above, in the present embodiment, positioning accuracy can be improved by performing positioning, on the basis of reliability level information, on indoor distance information that significantly varies in quality due to multipaths.

2. Second Embodiment (2-1. Problems of Conventional Technology)

In recent years, a distance measurement technique using a wireless signal has been attracting attention as a technique of indoor positioning technology. This is because many wireless communication ICs of BLE, or Wi-Fi, LTE, or the like are already built into smartphones, pre-learning or the like is not required, and loading into an application is easy.

Many techniques have been proposed as distance measurement techniques using a wireless signal. As one of the techniques, a technique using the RSSI described above is currently being commercialized. More specifically, the RSSI is a technique based on the Friis transmission formula described below.

$$L[dB] = \qquad \text{[Mathematical Formula 1]}$$
$$10\log_{10}\left[\frac{4\pi d}{\lambda}\right]^2 - (10\log_{10}G_T + 10\log_{10}T_R)$$

In the above-described Friis transmission formula, L represents propagation loss, λ represents a wavelength, d represents a distance between a transmission antenna and a reception antenna, and $G_T$ and $G_R$ represent absolute gains of the transmission antenna and the reception antenna, respectively.

Figure 21:
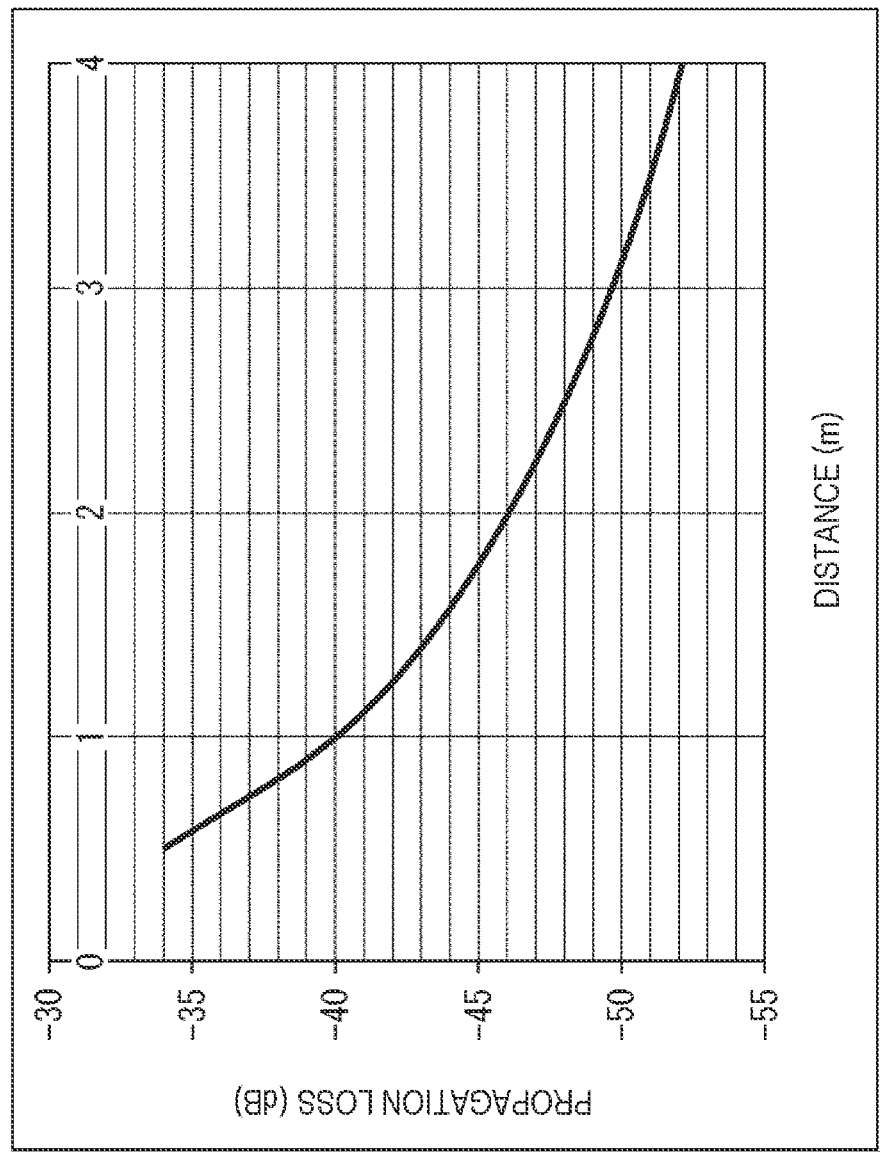
FIG. 21 is a diagram illustrating a relation between propagation loss and distance.

FIG. 21 is a diagram illustrating a relation between a distance d propagation loss L.

As illustrated in FIG. 21, the smaller the distance d, the smaller the propagation loss L, and the larger the distance d, the larger the propagation loss L. The RSSI is a technique for determining that distance is close when signal intensity of a reception signal is high, and that distance is far when signal intensity of a reception signal is low, on the basis of a relation between the distance d and the propagation loss L as illustrated in FIG. 21.

However, in distance measurement using the RSSI, distance measurement accuracy is reduced due to an effect of multipaths or non-uniformity of radiation characteristics of the antennas, as described with reference to FIGS. 3 and 4.

Furthermore, a distance measurement technique using RTT (Round Trip Time) is also under study. The RTT is a distance measurement technique utilizing the fact that a distance can be found by measuring time of communication between devices and multiplying the communication time by light speed.

Figure 22:
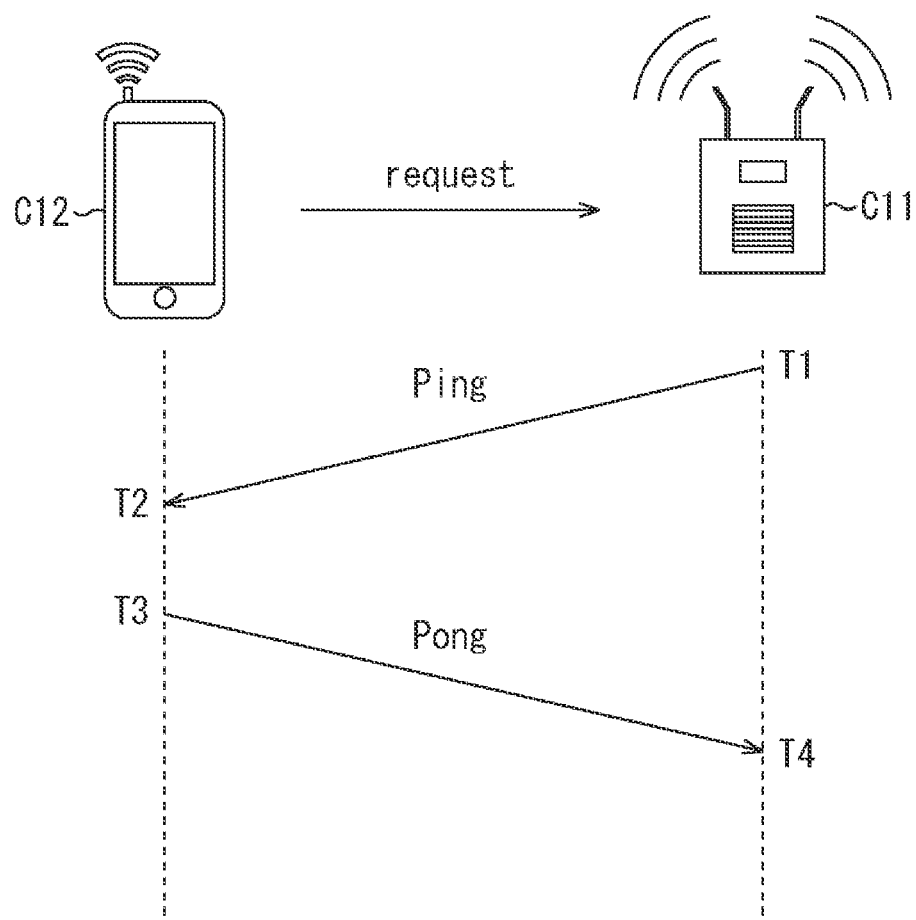
FIG. 22 is a diagram illustrating an example of distance measurement using RTT.

For example, as illustrated in FIG. 22, it is assumed that time when the device C11 transmits Ping to the device C12 after receiving a request from the device C12 is T1, and time when the device C12 receives the Ping is T2. Furthermore, it is assumed that time when the device C12 transmits Pong to the received Ping is T3, and time when the device C11 receives the Pong is T4.

In a case where light speed is c, a distance between the device C11 and the device C12 is found by {(T4−T1)−(T3−T2)}×c.

It is known that, unlike the RSSI, a distance measurement technique using the RTT does not depend on a distance even if amplitude fluctuates, and therefore accuracy of distance measurement using the RTT is more improved than accuracy of measurement using the RSSI. However, because a time error of in seconds is a distance measurement error of 30 cm, a time error such as variation in sampling interval or a delay in an internal circuit causes reduction in distance measurement accuracy.

As a technique for solving these problems, there is a distance measurement technique with the phase-based method described with reference to FIG. 7.

As described above, because the phase-based method uses the slope of a phase for each frequency, the method can be said to be a technique for calculating distance on the basis of a frequency characteristic (relative difference information of frequency) of a propagation channel. Therefore, there is an advantage that the calculated distance does not depend on an absolute value of a circuit delay of each block, variation in temperature characteristic, or the like.

Meanwhile, in the phase-based method, distance measurement accuracy is improved as the number of measurement channels increases because measurement is performed while changing frequency by channel steps, whereas the phase-based method requires measurement time and consumes more power. Furthermore, distance measurement accuracy is improved by using advanced signal processing such as distance calculation by Fast Fourier Transform (FFT) processing, power consumption is also increased.

In this way, there is a trade-off between distance measurement accuracy and power consumption, and it is necessary to select an optimum distance measurement technique in consideration of distance measurement accuracy and power consumption.

Furthermore, for example, a distance measurement technique using a wireless signal requires power supply to a distance measurement infrastructure such as a beacon device. The electric power is generally supplied by wire or from a battery. However, the former requires a high cost for wiring work or the like, and the latter requires regular battery replacement and therefore requires a maintenance cost.

Accordingly, in recent years, power supply by solar cells is expected. If power is supplied by solar cells, labor and costs for wiring work, battery replacement, or the like will not be required. Meanwhile, power obtained from the solar cells is uniquely determined by indoor light, whereas power consumption varies greatly depending on the number of users who utilize service. This means that power consumption varies with time, and in a case where a highly accurate distance measurement technique is used, there is a possibility that battery capacity becomes tight when the number of users peaks.

In this case, it is necessary to select an optimum distance measurement technique in consideration of a remaining battery level.

Accordingly, in the present embodiment, a configuration is implemented in which an optimum distance measurement technique can be selected according to a state of power supply.

(2-2. Configuration of Communication Module)

Figure 23:
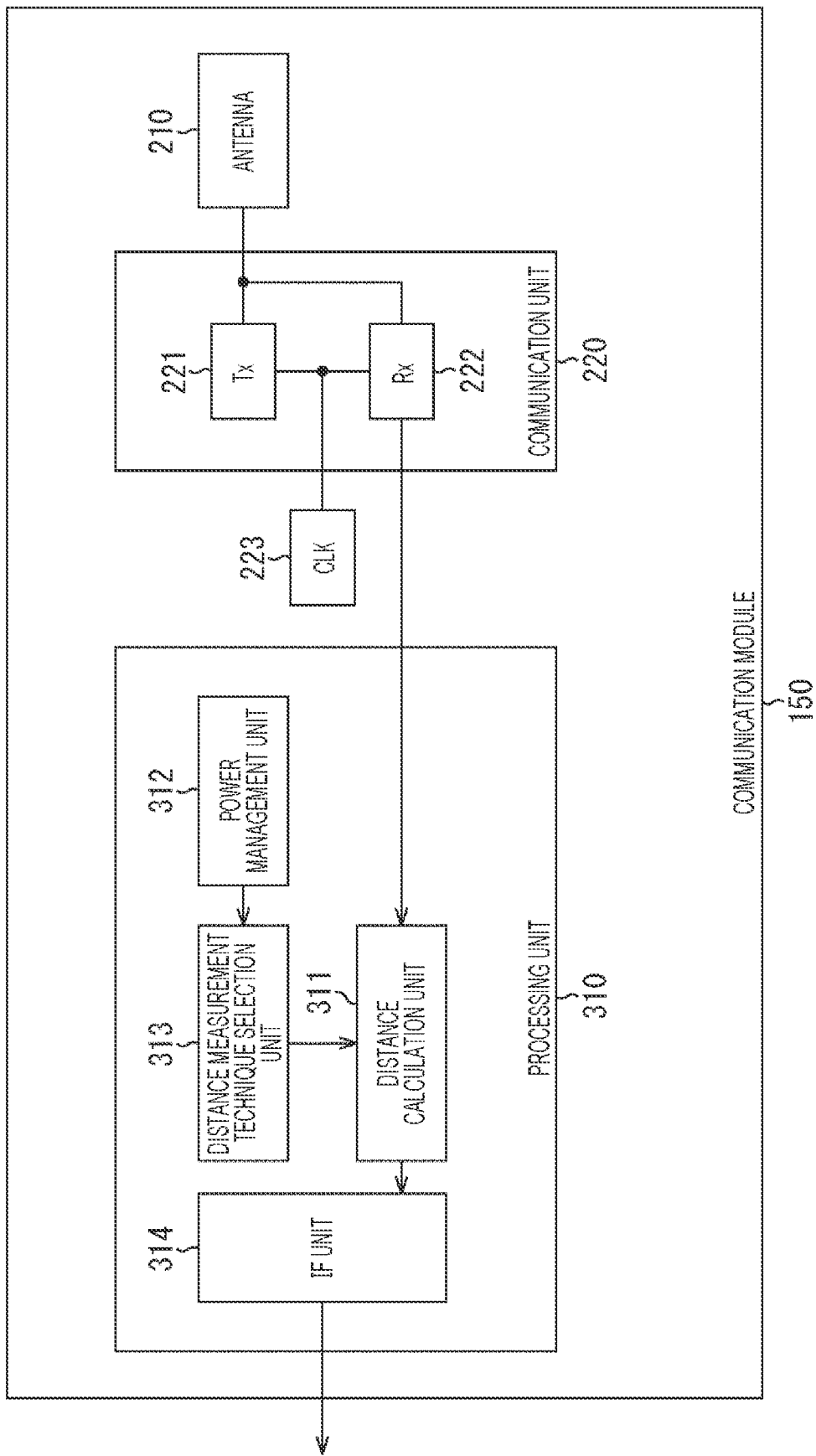
FIG. 23 is a block diagram illustrating another functional configuration example of a communication module.

FIG. 23 is a block diagram illustrating a functional configuration example of the communication module 150 according to the present embodiment.

The communication module 150 in FIG. 23 includes an antenna 210, a communication unit 220, and a processing unit 310. Because the antenna 210 and the communication unit 220 have a configuration similar to the configuration as illustrated in FIG. 10, the description thereof will be omitted.

The processing unit 310 includes a distance calculation unit 311, a power management unit 312, a distance measurement technique selection unit 313, and an IF unit 314.

The distance calculation unit 311 calculates the phase (phase value) of the propagation channel for each frequency on the basis of the phase of the transmission signal transmitted from the transmitter 221 and the phase of the reception signal received by the receiver 222, and calculates information of the distance to a communication apparatus to communicate with, on the basis of a phase value for each frequency.

Furthermore, the distance calculation unit 311 calculates information of a distance to a communication apparatus by using any one of a plurality of distance measurement techniques based on a wireless signal in wireless communication.

The power management unit 312 manages a state of power supply of the communication module 150, and sequentially supplies state information representing the state to the distance measurement technique selection unit 313.

On the basis of a state of the power supply of the communication module 150 represented by the state information from the power management unit 312, the distance measurement technique selection unit 313 selects a distance measurement technique used for calculation of the distance information. As a result, the distance calculation unit 311 calculates information of a distance to the communication apparatus by using the distance measurement technique selected by the distance measurement technique selection unit 313. The calculated distance information is supplied to the IF unit 314.

The IF unit 314 outputs the distance information from the distance calculation unit 311 to the control unit 110. The position calculation unit 111 of the control unit 110 can calculate position information by using distance information from the communication module 150.

Figure 24:
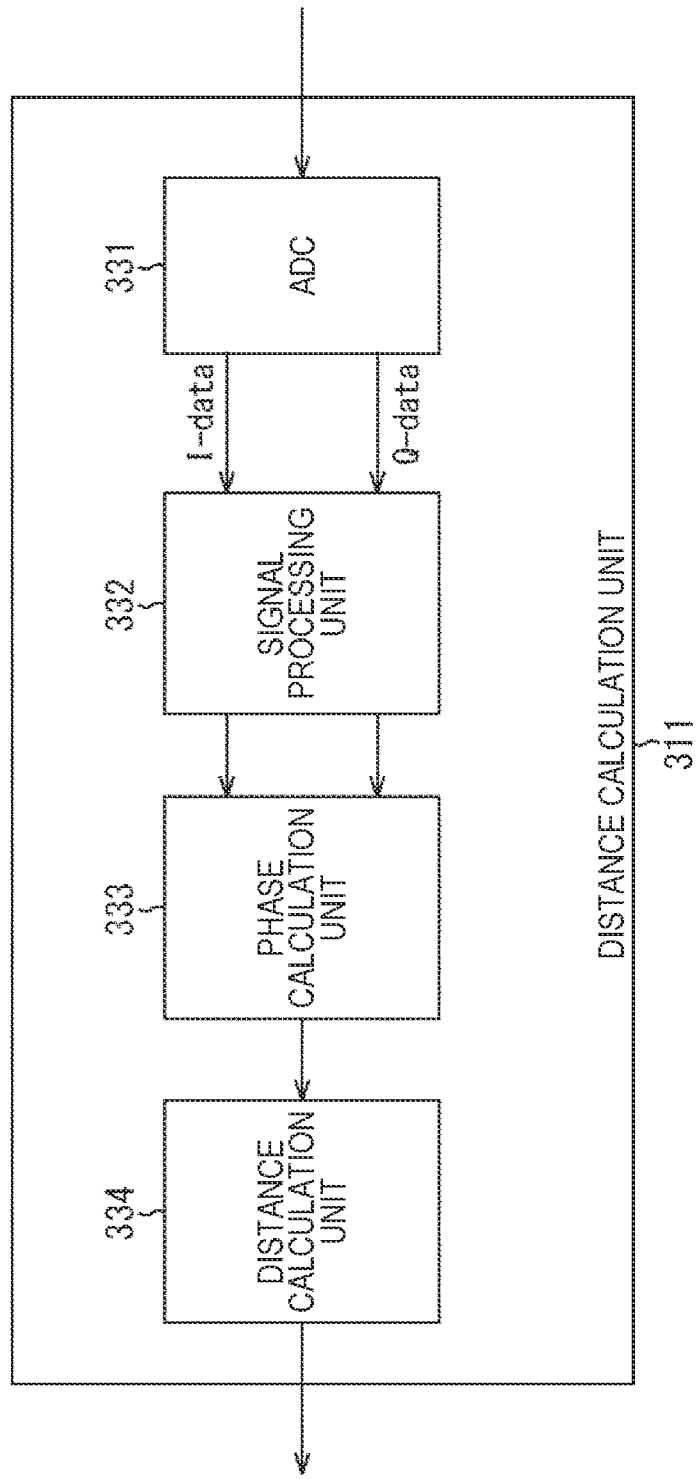
FIG. 24 is a block diagram illustrating a functional configuration example of a distance calculation unit.

FIG. 24 is a block diagram illustrating a functional configuration example of the distance calculation unit 311.

The distance calculation unit 311 includes an analog digital converter (ADC) 331, a signal processing unit 332, a phase calculation unit 333, and a distance calculation unit 334. Of these, the ADC 331, the signal processing unit 332 and the phase calculation unit 333 correspond to the phase calculation unit 231 in FIG. 10, and the distance calculation unit 334 corresponds to the distance calculation unit 232 in FIG. 10.

The ADC 331 converts an analog reception signal received by the receiver 222 into a digital signal and separates the digital signal into I data and Q data. The separated I/Q data is supplied to the signal processing unit 332.

The signal processing unit 332 performs signal processing on a waveform of the I/Q data from the ADC 331, and supplies amplitude values of the obtained I/Q data to the phase calculation unit 333.

Figure 25:
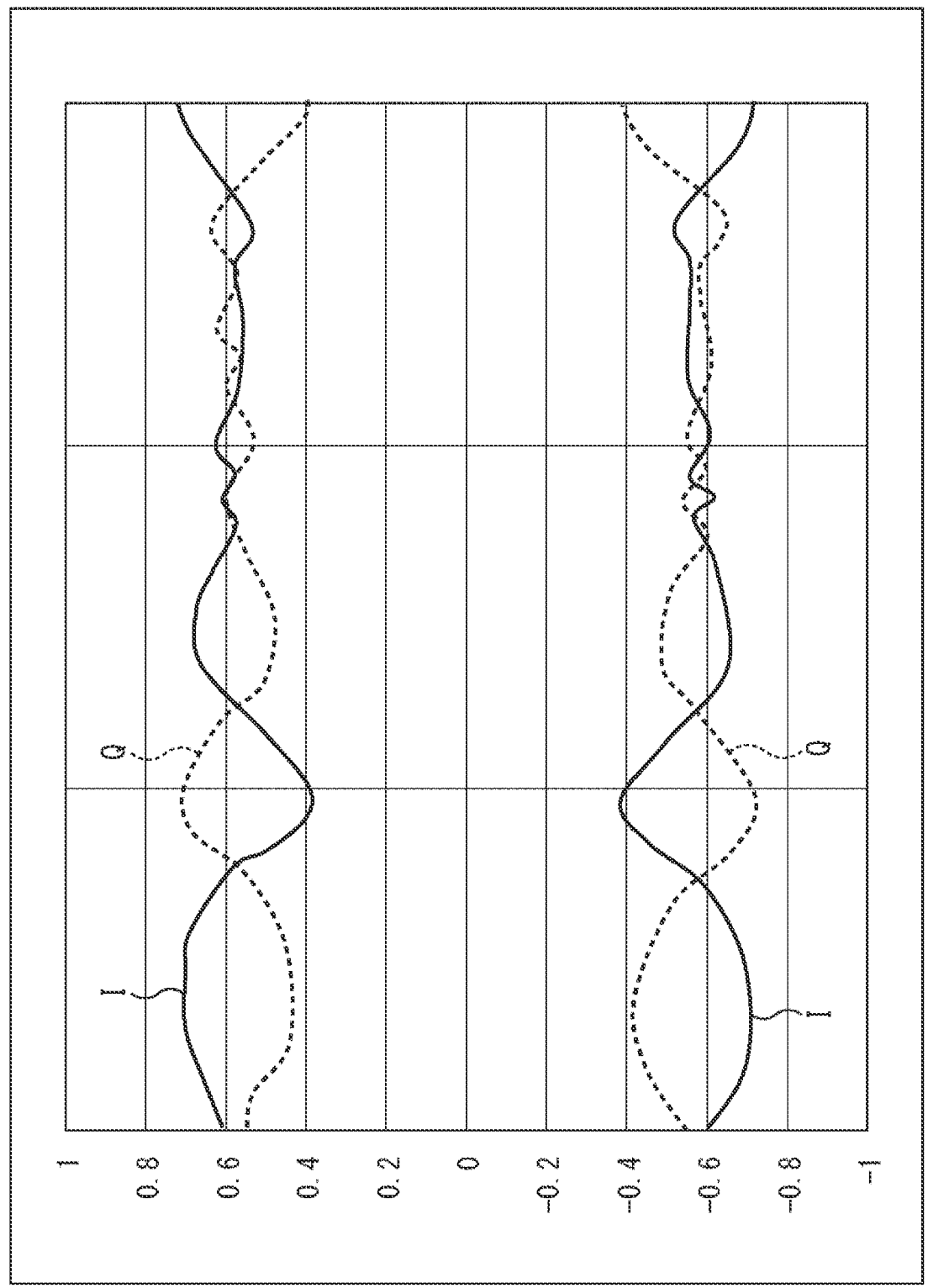
FIG. 25 is a diagram illustrating examples of a waveform of I/Q data.

The signal processing unit 332 finds, for example, an average value of the amplitudes of the waveforms of the I data and the Q data as illustrated in FIG. 25. FIG. 25 illustrates envelopes of waveforms of the respective I data and Q data, and average values of amplitudes of the waveforms of the I data and the Q data can be found on the basis of these envelopes.

The phase calculation unit 333 calculates a phase difference value on the basis of the amplitude values of the I/Q data from the signal processing unit 332. The calculated phase value is supplied to the distance calculation unit 334.

The distance calculation unit 334 calculates distance information on the basis of the phase value calculated by the phase calculation unit 333 and supplies the distance information to the IF unit 314.

(2-3. Calculation of Distance Information)

Next, processing of calculating distance information by the communication module 150 in FIG. 23 will be described with reference to the flowchart in FIG. 26.

In Step S111, the power management unit 312 determines whether or not power is supplied by a battery. Here, it is determined whether the power is supplied by a battery including, for example, solar cells or the like, or by a wired connection.

In a case where it is determined that the power is supplied by a battery, the processing proceeds to Step S112, and the power management unit 312 determines whether or not the remaining battery level is equal to or more than a predetermined threshold value.

In a case where it is determined that the remaining battery level is equal to or more than the predetermined threshold value, the processing proceeds to Step S113.

Meanwhile, in a case where it is determined in Step S111 that the power is not supplied by a battery, that is, in a case where the power is supplied by a wired connection, Step S112 is skipped and the processing proceeds to Step S113.

In Step S113, the distance measurement technique selection unit 313 selects a first distance measurement technique with high accuracy as the distance measurement technique.

Then, in Step S114, the distance calculation unit 311 calculates information of a distance to the communication apparatus by using the first distance measurement technique selected by the distance measurement technique selection unit 313.

That is, in the case of power supply by a wired connection, it is judged that there is no problem in the state of power supply, and the distance information is calculated by using the first distance measurement technique with high accuracy. Furthermore, even in a case where power is supplied by a battery, it is judged that there is sufficient power in a case where a remaining battery level is equal to or more than a predetermined threshold value, and the distance information is calculated by using the first distance measurement technique with high accuracy.

Now, in a case where it is determined in Step S112 that the remaining battery level is not equal to or more than the predetermined threshold value, the processing proceeds to Step S115.

In Step S115, the distance measurement technique selection unit 313 selects a second distance measurement technique with low accuracy as the distance measurement technique.

Then, in Step S116, the distance calculation unit 311 calculates information of a distance to the communication apparatus by using the second distance measurement technique selected by the distance measurement technique selection unit 313.

That is, in a case where power is supplied by a battery and in a case where the remaining battery level is less than the predetermined threshold value, it is judged that a power state is tight and the distance information is calculated by using the second distance measurement technique with low accuracy.

According to the above processing, an optimum distance measurement technique can be selected according to a state of power supply, and as a result, adaptive positioning is possible.

Here, specific examples of the first distance measurement technique with high accuracy and the second distance measurement technique with low accuracy will be described.

Specific Example 1

Distance measurement with the phase-based method is performed in the first distance measurement technique with high accuracy, and distance measurement using the RSSI is performed in the second distance measurement technique with low accuracy.

According to the distance measurement with the phase-based method, although power consumption is increased, distance measurement accuracy can be improved. Meanwhile, according to the distance measurement using the RSSI, although distance measurement accuracy is reduced, power consumption can be reduced.

Note that, as the second distance measurement technique with low accuracy, distance measurement using the RTT may be performed instead of distance measurement using the RSSI.

Specific Example 2

In the first distance measurement technique with high accuracy, in the distance measurement with the phase-based method, a group delay is calculated by, for example, calculating phase values of frequencies for 80 channels, as described with reference to B of FIG. 7. Meanwhile, in the second distance measurement technique with low accuracy, in the distance measurement with the phase-based method, a group delay is calculated by, for example, calculating phase values of frequencies for 10 channels. Note that the number of channels for which a phase value is calculated is not limited thereto.

Figure 27:
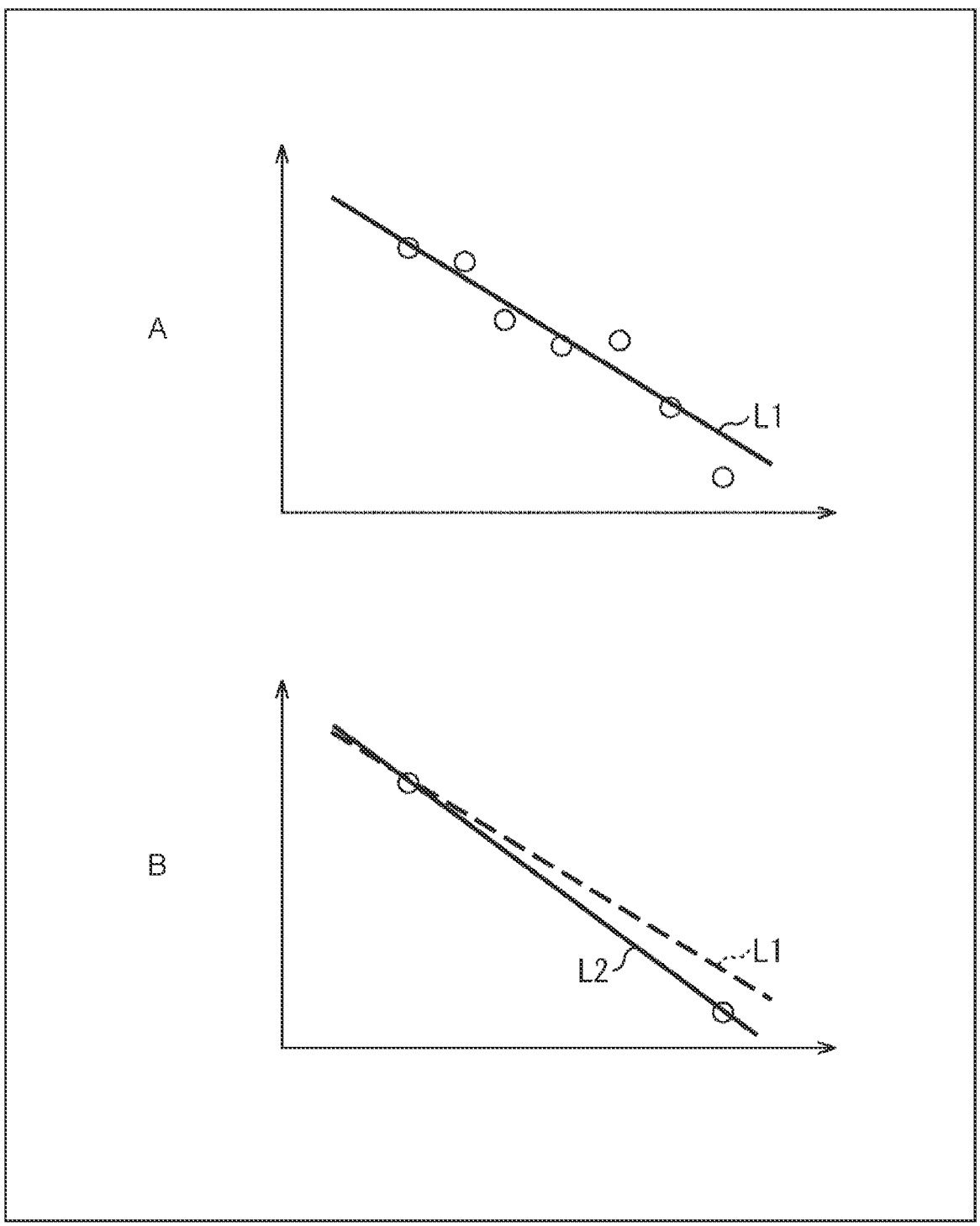
FIG. 27 is a diagram describing calculation of a group delay.

FIG. 27 is a diagram describing calculation of a group delay corresponding to the number of phase value measurement.

There is a possibility that phase values varies or fluctuate due to an effect of phase noise or multipaths.

Accordingly, as illustrated in A of FIG. 27, in a case where the number of phase value measurement is increased and a group delay is calculated with the least squares method, an effect of an outlier can be alleviated with respect to an obtained straight line L1. Meanwhile, it causes an increase in measurement time or an increase in power consumption to measure phase values for many frequency channels.

Furthermore, as illustrated in B of FIG. 27, in a case where the number of phase value measurement is reduced and a group delay is calculated with the least squares method, an effect of an outlier may not be able to be alleviated with respect to an obtained straight line L2. However, an increase in measurement time or an increase in power consumption can be prevented, because a phase value is not measured for many frequency channels.

In this way, the number of phase value measurement, a group delay calculation algorithm, or the like may be adaptively changed according to a state of power supply.

Specific Example 3

In the first distance measurement technique with high accuracy, in the distance measurement with the phase-based method, a phase value is calculated by using advanced signal processing. Meanwhile, in the second distance measurement technique with low accuracy, in the distance measurement with the phase-based method, a phase value is calculated by using ordinary signal processing.

As described above, in the distance measurement with the phase-based method, a phase value is calculated on the basis of a balance of amplitude of I/Q data obtained by demodulating a reception signal, and waveforms of the I/Q data include an effect of phase noise or other noise.

Accordingly, for example, by performing Fast Fourier Transform (FFT) processing on the waveforms of the I/Q data illustrated in FIG. 25 and extracting a fundamental wave component, an effect of noise on the waveforms of the I/Q data can be alleviated.

Figure 28:
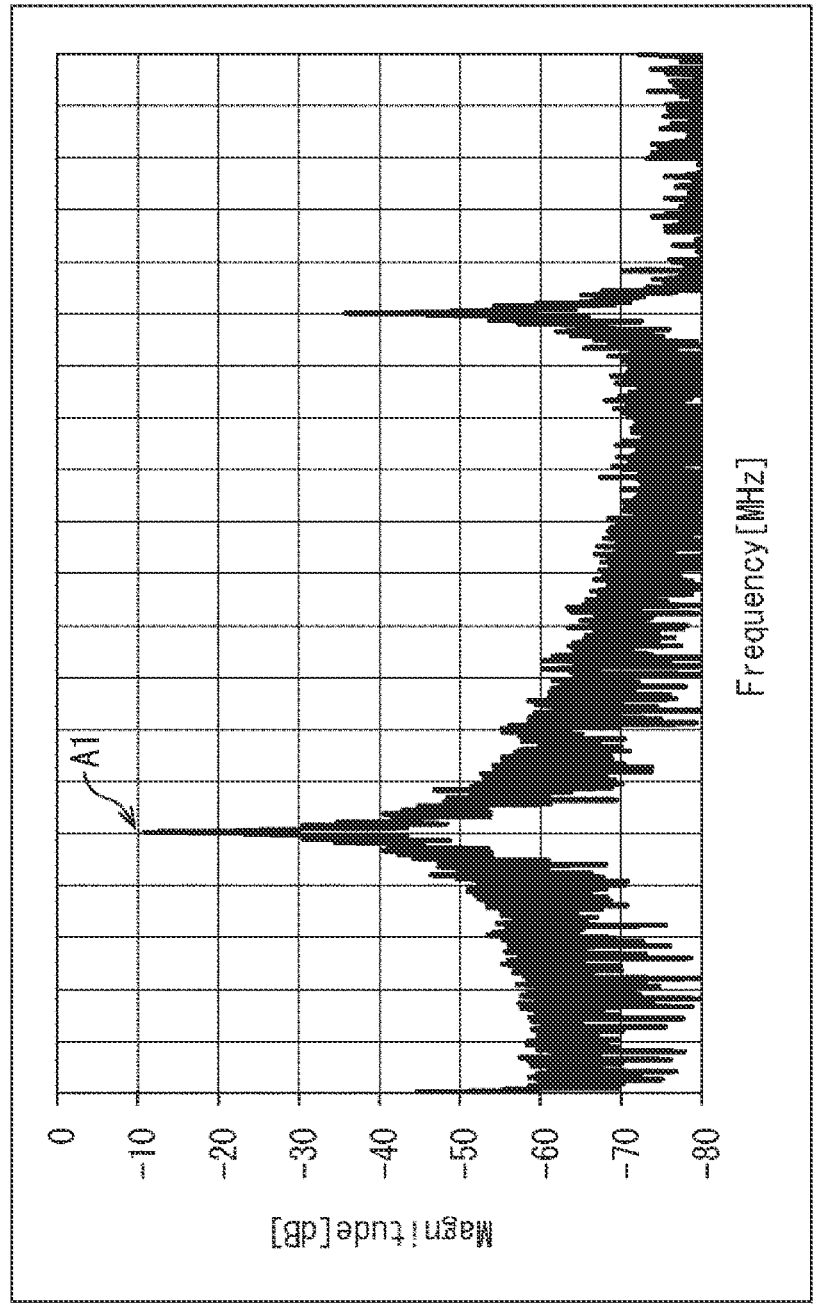
FIG. 28 is a diagram illustrating examples of a waveform of FFT data.

FIG. 28 is a diagram illustrating an example of a waveform of FFT data obtained by performing FFT processing on a waveform of I/Q data.

As illustrated in FIG. 28, although the waveforms of the I/Q data includes many frequency components, an amplitude value A can be easily obtained from the FFT data. However, by performing FFT processing, an amount of calculation or power consumption increases.

Accordingly, a phase value is calculated on the basis of an amplitude value obtained by the FFT processing in a case where there is sufficient power, and a phase value is calculated on the basis of an average value of amplitude of I/Q data in a case where power is tight.

Specific Example 4

In the first distance measurement technique with high accuracy, in the distance measurement with the phase-based method, a phase value is calculated on the basis of an amplitude measurement value of I/Q data for 500 p seconds, for example, as a time range. Meanwhile, in the second distance measurement technique with low accuracy, in the distance measurement with the phase-based method, a phase value is calculated on the basis of an amplitude measurement value of I/Q data for 100 p seconds, for example, as a time range.

The longer measurement time of amplitude of the I/Q data, the greater an effect of noise reduction. However, because there is a trade-off between noise reduction and an increase in power consumption, measurement time of amplitude of the I/Q data is changed according to power.

In the above, it is assumed that either the first distance measurement technique with high accuracy or the second distance measurement technique with low accuracy is selected according to whether or not a remaining battery level is equal to or more than a predetermined threshold value.

Hereinafter, an example in which either the first distance measurement technique with high accuracy or the second distance measurement technique with low accuracy is selected according to further conditions will be described.

Figure 29:
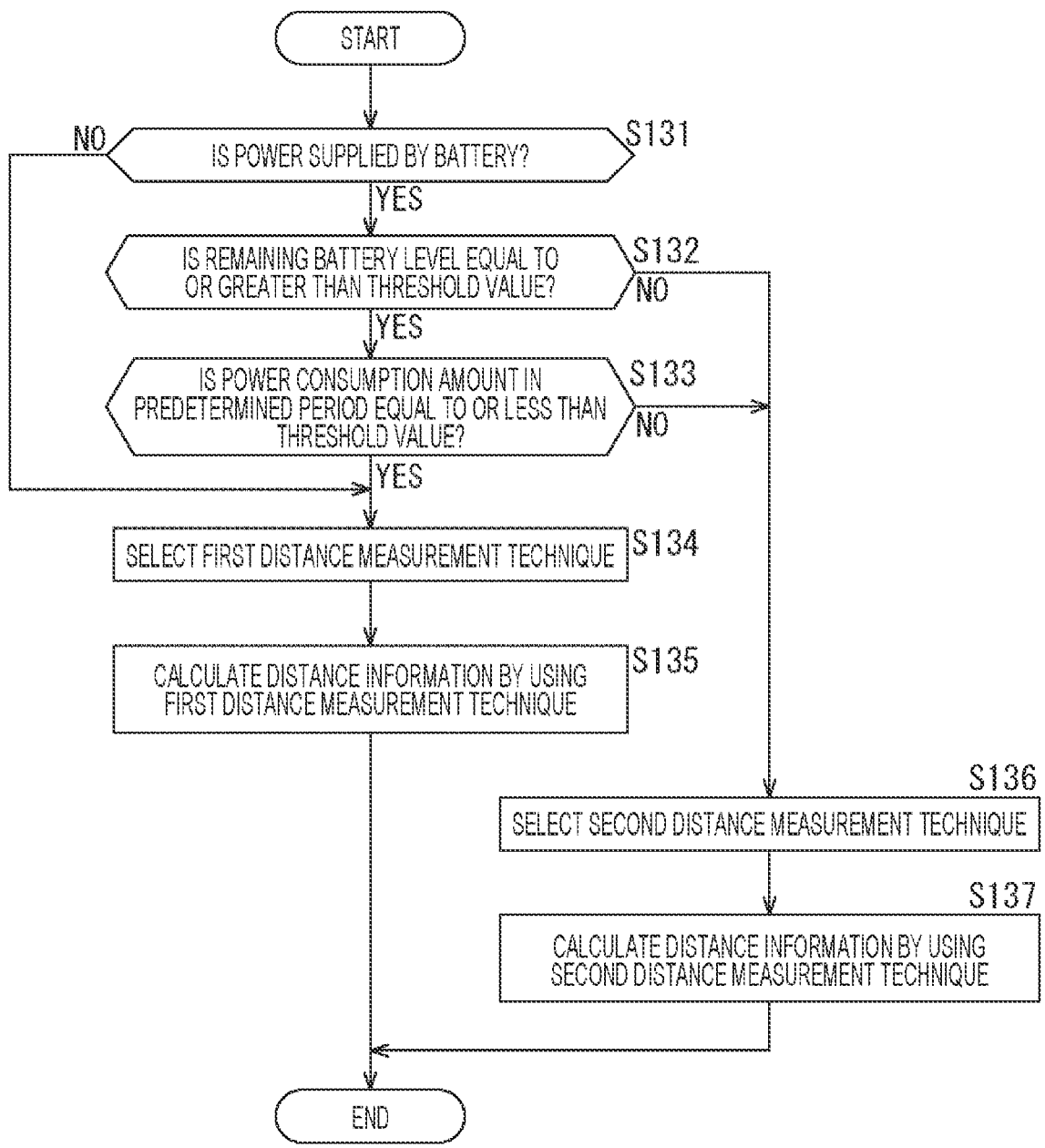
FIG. 29 is a flowchart describing processing of calculating distance information.

FIG. 29 is a flowchart describing another example of the processing of calculating distance information.

Figure 26:
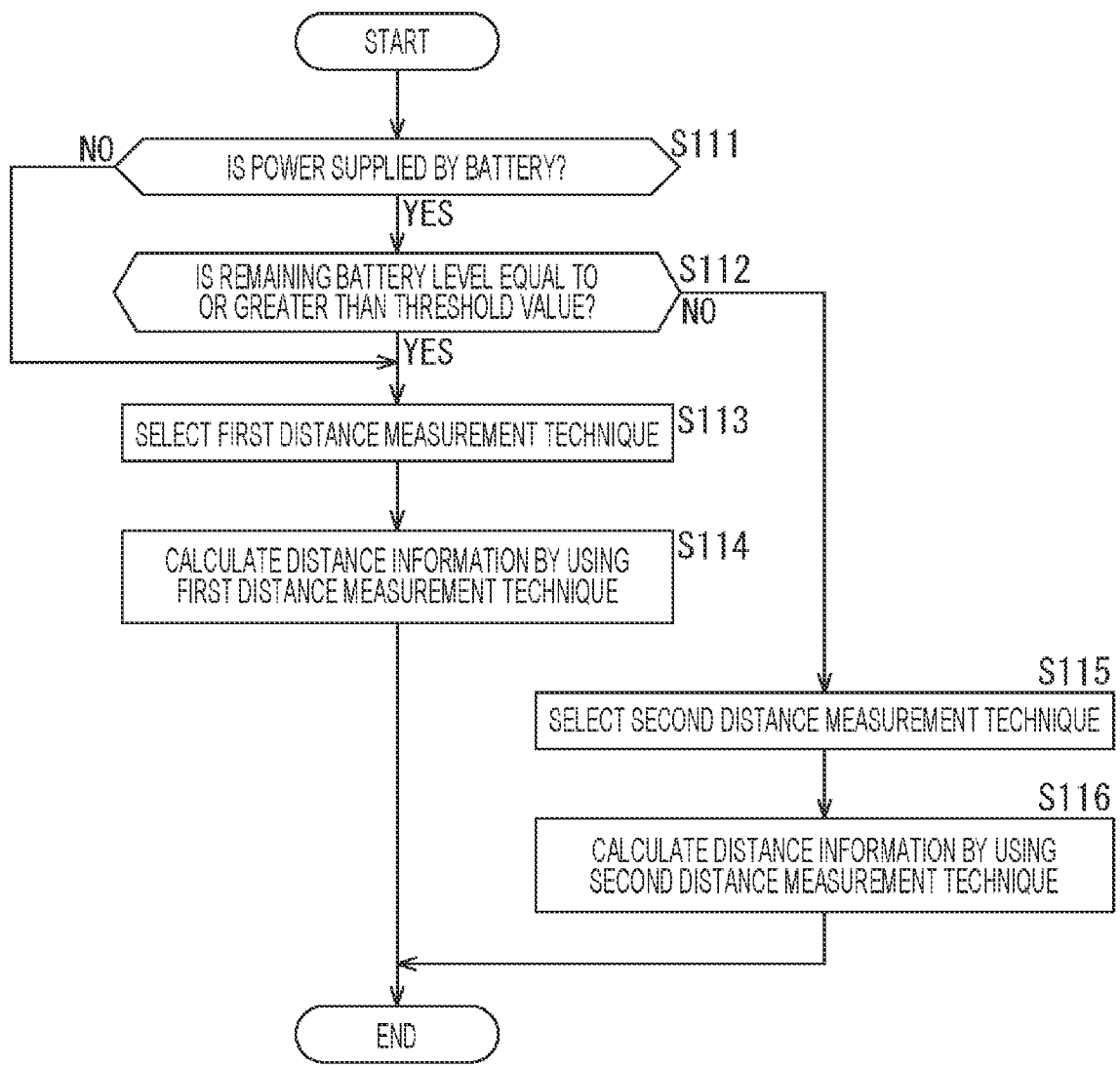
FIG. 26 is a flowchart describing processing of calculating distance information.

Because processing in Steps S131, S132, and S134 to S137 in the flowchart in FIG. 29 is similar to processing in Steps S111 to S116 in the flowchart in FIG. 26, description thereof will be omitted.

That is, in a case where it is determined in Step S132 that the remaining battery level is equal to or more than the predetermined threshold value, the processing proceeds to Step S133.

In Step S133, the power management unit 312 determines whether or not a power consumption amount in a predetermined period is equal to or less than a predetermined threshold value.

In a case where it is determined that the power consumption amount in the predetermined period is equal to or less than the predetermined threshold value, the processing proceeds to Step S134, the first distance measurement technique is selected, and distance information is calculated by using the first distance measurement technique.

That is, in a case where a remaining battery level is equal to or more than a predetermined threshold value, and a power consumption amount in the predetermined period is equal to or less than the predetermined threshold value, it is judged that there is sufficient power, and the distance information is calculated by using the first distance measurement technique with high accuracy.

Meanwhile, in a case where it is determined that the power consumption amount in the predetermined period is not equal to or less than the predetermined threshold value, the processing proceeds to Step S136, the second distance measurement technique is selected, and distance information is calculated by using the second distance measurement technique.

That is, even in a case where a remaining battery level is equal to or more than the predetermined threshold value, it is judged that power is tight in a case where a power consumption amount in the predetermined period exceeds the predetermined threshold value, and the distance information is calculated by using the second distance measurement technique with low accuracy.

According to the above processing also, an optimum distance measurement technique can be selected according to a state of power supply, and as a result, adaptive positioning is possible.

Note that, in the processing in FIG. 29, a threshold value related to a power consumption amount may be a fixed value or may be adjusted according to a power supply amount.

Figure 30:
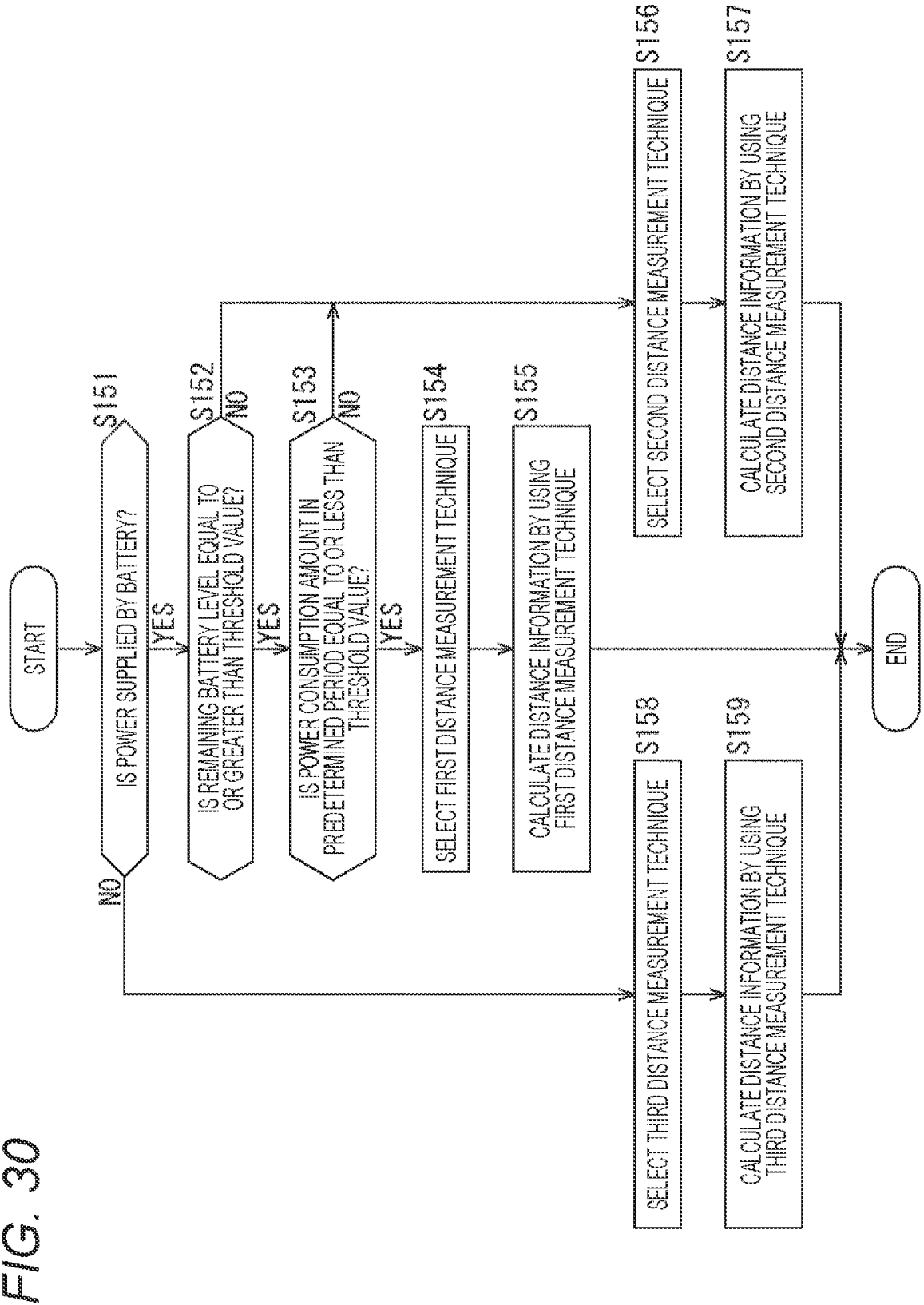
FIG. 30 is a flowchart describing processing of calculating distance information.

FIG. 30 is a flowchart describing yet another example of the processing of calculating distance information.

Because processing in Steps S151 to S157 in the flowchart in FIG. 30 is similar to processing in Steps S131 to S137 in the flowchart in FIG. 29, description thereof will be omitted.

That is, in a case where it is determined in Step S151 that the power is not supplied by a battery, that is, in a case where the power is supplied by a wired connection, the processing proceeds to Step S158.

In Step S158, the distance measurement technique selection unit 313 selects a third distance measurement technique with higher accuracy than accuracy of the first distance measurement technique.

Then, in Step S159, the distance calculation unit 311 calculates information of a distance to the communication apparatus by using the third distance measurement technique selected by the distance measurement technique selection unit 313.

Here, a specific example of either the first distance measurement technique or second distance measurement technique described above can be applied to, or another technique can be applied to the first distance measurement technique, the second distance measurement technique, or the third distance measurement technique.

According to the above processing also, an optimum distance measurement technique can be selected according to a state of power supply, and as a result, adaptive positioning is possible.

As described above, in the present embodiment, by adaptively switching a distance measurement technique according to a state of power supply, it is possible to avoid service interruption due to power shortage and improve usability.

Embodiments of the present technology are not limited to the above-described embodiments, and various changes can be made without departing from the scope of the present technology.

Furthermore, the effects described herein are only examples, and the effects of the present technology are not limited to these effects. Additional effects may also be obtained.

The present disclosure can have the following configurations.

(1)
A communication device including
a communication unit that performs wireless communication with a peripheral communication apparatus, and
a processing unit that outputs, on the basis of a frequency characteristic of a propagation channel, information of a distance to the communication apparatus and reliability level information representing a reliability level of the distance information.

(2)
The communication device according to (1),
in which the processing unit calculates the distance information and the reliability level information by calculating a phase of the propagation channel for each frequency.

(3)
The communication device according to (2),
in which the distance information includes a value based on a slope of the phase within a predetermined frequency range.

(4)
The communication device according to (3),
in which the distance information includes a value found by multiplying a group delay by light speed, the group delay being obtained from the slope of the phase.

(5)
The communication device according to (2) or (3),
in which the reliability level information includes a value based on the phase within a predetermined frequency range.

(6)
The communication device according to (5),
in which the reliability level information includes a value based on a variation in the slope of the phase within the predetermined frequency range.

(7)
The communication device according to (5),
in which the reliability level information includes a value determined by artificial intelligence (AI) on the basis of the phase within the predetermined frequency range.

(8)
The communication device according to (5),
in which the reliability level information includes a value based on I/Q data obtained by demodulating a reception signal from the communication apparatus.

(9)
The communication device according to any one of (1) to (8), further including
a position calculation unit that calculates position information of a self-device on the basis of the distance information and the reliability level information.

(10)
The communication device according to (9),
in which the position calculation unit calculates the position information on the basis of three or more pieces of the information of the distance to the communication apparatus and the reliability level information.

(11)
The communication device according to (9),
in which the position calculation unit calculates the position information on the basis of two or more pieces of the information of the distance to the communication apparatus, the reliability level information, and one or more pieces of the position information calculated in a past.

(12)
The communication device according to (9),
in which the position calculation unit calculates the position information on the basis of one or more pieces of the information of the distance to the communication apparatus, the reliability level information, and direction information representing a direction of the communication apparatus.

(13)
The communication device according to (9),
in which the position calculation unit calculates the position information on the basis of one or more pieces of the information of the distance to the communication apparatus, the reliability level information, and locus information representing a locus of the self-device.

(14)
The communication device according to any one of (1) to (13),
in which the communication unit performs wireless communication in a bandwidth of 160 MHz or less.
(15)
The communication device according to any one of (1) to (13),
in which the communication unit performs wireless communication with at least one of BLE, Wi-Fi, or LTE.
(16)
A communication method including,
by a communication device,
performing wireless communication with a peripheral communication apparatus, and
outputting, on the basis of a frequency characteristic of a propagation channel, information of a distance to the communication apparatus and reliability level information representing a reliability level of the distance information.

Moreover, the present disclosure can also have the following configurations.
(1)
A communication device including
a communication unit that performs wireless communication with a peripheral communication apparatus, and
a processing unit that calculates information of a distance to the communication apparatus by using any one of a plurality of distance measurement techniques based on a wireless signal in the wireless communication,
in which the processing unit selects the distance measurement technique used for calculation of the distance information on the basis of a state of power supply of a self-device.
(2)
The communication device according to (1),
in which the processing unit selects the distance measurement technique on the basis of a remaining battery level.
(3)
The communication device according to (1) or (2),
in which the processing unit selects the distance measurement technique on the basis of whether power is supplied by a battery or by a wired connection.
(4)
The communication device according to any one of (1) to (3),
in which the processing unit selects the distance measurement technique on the basis of a power consumption amount in a predetermined period.
(5)
The communication device according to any one of (1) to (4),
in which the processing unit calculates the distance information by using a distance measurement technique by at least any one of a received signal strength indicator (RSSI), a phase-based method, or Round Trip Time (RTT).
(6)
The communication device according to any one of (1) to (4),
in which the processing unit calculates the distance information by using either a first distance measurement technique by a phase-based method based on a first the number of measurement within a predetermined frequency range, or a second distance measurement technique by the phase-based method based on a second the number of measurement within the predetermined frequency range.
(7)
The communication device according to any one of (1) to (4),
in which the processing unit calculates the distance information by using either a first distance measurement technique by a phase-based method based on measurement within a first time range, or a second distance measurement technique by the phase-based method based on measurement within a second time range.
(8)
The communication device according to any one of (1) to (4),
in which the processing unit calculates the distance information by using either a first distance measurement technique by a phase-based method including FFT processing, or a second distance measurement technique by the phase-based method not including the FFT processing.
(9)
The communication device according to any one of (1) to (8),
in which the processing unit selects a first distance measurement technique with higher accuracy in a case where the state of power supply is sufficient, and selects a second distance measurement technique with lower accuracy in a case where the state of power supply is not sufficient.
(10)
The communication device according to any one of (1) to (9), further including
a position information calculation unit that calculates position information of a self-device on the basis of the distance information.
(11)
A communication method including,
by a communication device,
performing wireless communication with a peripheral communication apparatus,
selecting any one of a plurality of distance measurement techniques based on a wireless signal in the wireless communication on the basis of a power state of a self-device, and
calculating information of a distance to the communication apparatus by using the selected distance measurement technique.

REFERENCE SIGNS LIST

100 Communication terminal
110 Control unit
111 Position calculation unit
120 Input unit
130 Output unit
140 Storage unit
150 Communication module
210 Antenna
220 Communication unit
221 Transmitter
222 Receiver
223 Oscillator
230 Processing unit
231 Phase calculation unit
232 Distance calculation unit
233 Reliability level calculation unit 234 IF unit
310 Processing unit
311 Distance calculation unit
312 Power management unit
313 Distance measurement technique selection unit
314 IF unit

The invention claimed is:

1. A communication device comprising:
a communication circuit that performs wireless communication with a peripheral communication apparatus; and
a processor that outputs, on a basis of a frequency characteristic of a propagation channel, information of a distance to the communication apparatus and reliability level information representing a reliability level of the distance information,
wherein the processor calculates the distance information and the reliability level information by calculating a phase of the propagation channel for each frequency.

2. The communication device according to claim 1, wherein the distance information includes a value based on a slope of the phase within a predetermined frequency range.

3. The communication device according to claim 2, wherein the distance information includes a value found by multiplying a group delay by light speed, the group delay being obtained from the slope of the phase.

4. The communication device according to claim 1, wherein the reliability level information includes a value based on the phase within a predetermined frequency range.

5. The communication device according to claim 4, wherein the reliability level information includes a value based on a variation in a slope of the phase within the predetermined frequency range.

6. The communication device according to claim 4, wherein the reliability level information includes a value determined by artificial intelligence (AI) on a basis of the phase within the predetermined frequency range.

7. The communication device according to claim 4, wherein the reliability level information includes a value based on I/Q data obtained by demodulating a reception signal from the communication apparatus.

8. The communication device according to claim 1, further comprising a position calculation unit that calculates position information of a self-device on a basis of the distance information and the reliability level information.

9. The communication device according to claim 8, wherein the position calculation unit calculates the position information on a basis of three or more pieces of the information of the distance to the communication apparatus and the reliability level information.

10. The communication device according to claim 8, wherein the position calculation unit calculates the position information on a basis of two or more pieces of the information of the distance to the communication apparatus, the reliability level information, and one or more pieces of the position information calculated in a past.

11. The communication device according to claim 8, wherein the position calculation unit calculates the position information on a basis of one or more pieces of the information of the distance to the communication apparatus, the reliability level information, and direction information representing a direction of the communication apparatus.

12. The communication device according to claim 8, wherein the position calculation unit calculates the position information on a basis of one or more pieces of the information of the distance to the communication apparatus, the reliability level information, and locus information representing a locus of the self-device.

13. The communication device according to claim 1, wherein the communication circuit performs wireless communication in a bandwidth of 160 MHz or less.

14. The communication device according to claim 1, wherein the communication circuit performs wireless communication with at least one of BLE, Wi-Fi, or LTE.

15. A communication method comprising,
by a communication device:
performing wireless communication with a peripheral communication apparatus; and
outputting, on a basis of a frequency characteristic of a propagation channel, information of a distance to the communication apparatus and reliability level information representing a reliability level of the distance information; and
calculating the distance information and the reliability level information by calculating a phase of the propagation channel for each frequency.

16. A communication device comprising:
a communication circuit that performs wireless communication with a peripheral communication apparatus; and
a processor that calculates information of a distance to the communication apparatus by using any one of a plurality of distance measurement techniques based on a wireless signal in the wireless communication,
wherein the processor selects the distance measurement technique used for calculation of the distance information on a basis of a state of power supply of a self-device.

17. The communication device according to claim 16, wherein the processor selects the distance measurement technique on a basis of a remaining battery level.

18. The communication device according to claim 16, wherein the processor selects the distance measurement technique on a basis of whether power is supplied by a battery or by a wired connection.

19. The communication device according to claim 16, wherein the processor selects the distance measurement technique on a basis of a power consumption amount in a predetermined period.

20. The communication device according to claim 16, wherein the processor calculates the distance information by using a distance measurement technique by at least any one of a received signal strength indicator (RSSI), a phase-based method, or Round Trip Time (RTT).

21. The communication device according to claim 16, wherein the processor calculates the distance information by using either a first distance measurement technique by a phase-based method based on a first measurement value within a predetermined frequency range, or a second distance measurement technique by the phase-based method based on a second measurement value within the predetermined frequency range.

22. The communication device according to claim 16, wherein the processor calculates the distance information by using either a first distance measurement technique by a phase-based method based on measurement within a first time range, or a second distance measurement technique by the phase-based method based on measurement within a second time range.

23. The communication device according to claim 16, wherein the processor calculates the distance information by using either a first distance measurement technique by a phase-based method including FFT processing, or a second distance measurement technique by the phase-based method not including the FFT processing.

24. The communication device according to claim 16, wherein the processor selects a first distance measurement technique with higher accuracy in a case where the state of power supply is sufficient, and selects a second distance measurement technique with lower accuracy in a case where the state of power supply is not sufficient.

25. The communication device according to claim 16, further comprising a position information calculation unit that calculates position information of a self-device on a basis of the distance information.

26. A communication method comprising,
by a communication device:
performing wireless communication with a peripheral communication apparatus;
selecting any one of a plurality of distance measurement techniques based on a wireless signal in the wireless communication on a basis of a power state of a self-device; and
calculating information of a distance to the communication apparatus by using the selected distance measurement technique.

\* \* \* \* \*